US012589331B2

(12) United States Patent
Grünberg et al.

(10) Patent No.: US 12,589,331 B2
(45) Date of Patent: Mar. 31, 2026

(54) SYSTEM FOR MEMBRANE CHROMATOGRAPHY

(71) Applicant: Sartorius Stedim Biotech GmbH, Göttingen (DE)

(72) Inventors: Mario Grünberg, Göttingen (DE); Arne Bluma, Heilbad Heiligenstadt (DE); Dominik Stein, Clausthal-Zellerfeld (DE); Martin Leuthold, Göttingen (DE)

(73) Assignee: Sartorius Stedim Biotech GmbH (DE)

( * ) Notice: Subject to any disclaimer, the term of this patent is extended or adjusted under 35 U.S.C. 154(b) by 372 days.

(21) Appl. No.: 18/251,535

(22) PCT Filed: Oct. 28, 2021

(86) PCT No.: PCT/EP2021/079951
§ 371 (c)(1),
(2) Date: May 2, 2023

(87) PCT Pub. No.: WO2022/096358
PCT Pub. Date: May 12, 2022

(65) Prior Publication Data
US 2023/0405491 A1     Dec. 21, 2023

(30) Foreign Application Priority Data
Nov. 3, 2020     (EP) ..................................... 20205323

(51) Int. Cl.
*B01D 15/24*          (2006.01)
*B01D 15/12*          (2006.01)
*B01D 15/14*          (2006.01)

(52) U.S. Cl.
CPC ......... *B01D 15/247* (2013.01); *B01D 15/125* (2013.01); *B01D 15/14* (2013.01)

(58) Field of Classification Search
CPC ..... B01D 15/247; B01D 15/125; B01D 15/14
See application file for complete search history.

(56)              References Cited

U.S. PATENT DOCUMENTS 4,595,496 A       6/1986   Carson
4,911,405 A       3/1990   Weissgerber
                  (Continued)

FOREIGN PATENT DOCUMENTS

EP            0 328 696 A1      8/1989
WO     WO 2008/127087 A1     10/2008
                  (Continued)

OTHER PUBLICATIONS

Tofine flow-controls.com, "2 way motorized ball valve introduction". https://www.flow-controls.com/2-way-motorized-ball-valve-introduction.html. Dec. 17, 2012.*
                  (Continued)

*Primary Examiner* — Benjamin L Lebron
(74) *Attorney, Agent, or Firm* — Klarquist Sparkman, LLP

(57)              ABSTRACT
A chromatography system is provided. The chromatography system is configured to process a feed fluid containing a plurality of components, wherein at least one component of the plurality of components of the feed fluid is a target component. The chromatography system comprises: a flow path comprising a plurality of fluid control components configured to control a fluid flow; a stationary phase, wherein the stationary phase is at least one membrane adsorber connected to the flow path and the stationary phase is configured to isolate the target component. The flow path is configured such that harvesting of the target component is optimized.

14 Claims, 12 Drawing Sheets

(56) References Cited

U.S. PATENT DOCUMENTS

| | | | | |
|---|---|---|---|---|
| 6,649,047 | B1* | 11/2003 | Ottestad | B01D 53/22 |
| | | | | 210/120 |
| 2004/0020542 | A1* | 2/2004 | Cueni | G01N 30/20 |
| | | | | 137/625.31 |
| 2011/0107582 | A1* | 5/2011 | Frej | G01N 30/60 |
| | | | | 29/428 |
| 2016/0011155 | A1 | 1/2016 | Klein | |
| 2018/0149582 | A1* | 5/2018 | Taguchi | G01N 21/05 |
| 2019/0144414 | A1* | 5/2019 | Erfurt | B01D 15/185 |
| | | | | 549/390 |
| 2020/0031863 | A1 | 1/2020 | Müller-Späth et al. | |
| 2020/0054964 | A1* | 2/2020 | Blom | G01N 30/42 |
| 2020/0064314 | A1* | 2/2020 | Sievers-Engler | |
| | | | | G01N 30/7233 |
| 2020/0108401 | A1* | 4/2020 | Franzreb | B03C 1/0335 |
| 2020/0278329 | A1* | 9/2020 | Yanagibayashi | F04B 11/0058 |

FOREIGN PATENT DOCUMENTS

| | | |
|---|---|---|
| WO | WO 2012/078677 A2 | 6/2012 |
| WO | WO 2018/011102 A1 | 1/2018 |
| WO | WO 2020/173862 A1 | 9/2020 |

OTHER PUBLICATIONS

E-Separation Solutions, "The LCGC Blog: so just how well set-up is your UV detector?", LCGC International. Sep. 17, 2014.*

International Search Report and Written Opinion, mailed May 11, 2022, issued for International Patent Application No. PCT/EP2021/079951, 18 pages.

* cited by examiner

SYSTEM FOR MEMBRANE CHROMATOGRAPHY

CROSS REFERENCE TO RELATED APPLICATIONS

This is the U.S. National Stage of International Application No. PCT/EP2021/079951, filed Oct. 28, 2021, which was published in English under PCT Article 21 (2), which in turn claims the benefit of European Patent Application No. 20 205 323.7, filed Nov. 3, 2020. The prior applications are incorporated herein by reference in their entirety.

TECHNICAL FIELD

The following description relates to a system for membrane chromatography.

Background

Biopharmaceutical or pharmaceutical production involves the purification of solutions from which active pharmaceutical ingredients (API) are extracted. These solutions, also known as feeds, can be produced chemically-synthetically or biologically-organically. The feed comprises a plurality of components that need to be separated from each other, e.g. one or more target components and impurities. Chromatography is a technique used to perform this separation process.

The specifics of a chromatographic separation process may be chosen from a plurality of available options, for example concerning the interaction mechanism, the process type and the stationary phase. Based on the interaction mechanism, chromatography may be for example classified as ion exchange, hydrophobic interaction, affinity or mixed mode chromatography. The process type may relate to the temporal aspect of the process execution, such as batch or continuous operation, and/or to the aspect of the interaction between the target product and the separation medium in the stationary phase, such as capture, bind and elute or flow-through. Chromatographic stationary phases are e.g. particle/resin-, membrane-, monolith- and fibre-based.

The greatest differences in the chromatographic process steps result from kinetically-limited and not-kinetically-limited stationary phases. Kinetically limited stationary phases are those which typically require more than or about 2 minutes residence time for binding, such as resin-based stationary phases, while not-kinetically-limited stationary phases require less than 2 minutes for binding, such as membrane-based stationary phases.

Chromatographic processes usually consist of a plurality of cycles, each cycle comprising equilibration, loading, one to several washing steps, elution, regeneration and cleaning in place (CIP). In equilibration, the stationary phase is prepared for a loading step in which the binding sites for the respective target substances must be freely accessible. The equilibration buffer removes residuals from previous steps, such as from CIP, which negatively influence the binding properties of the stationary phase.

During loading, a feed comprising a mixture of components is made to interact with the stationary phase, wherein one or more components linger on the stationary phase while others move on. For example, in bind and elute mode the target component should bind to the stationary phase and the components to be separated should move past the stationary phase. Non-bound components are rinsed out in a wash step to prevent them from being carried over into the target component in the eluate during elution.

During elution, the target component is displaced from the binding sites of the stationary phase with an elution buffer by a change in the physicochemical environmental properties (pH value, conductivity) on the stationary phase and is then collected. During regeneration, a change in the physicochemical properties of the environment on the stationary phase more significant than in the elution step dissolves poorly soluble impurities (e.g. lipids, dyes, DNA) to restore the binding capacity of the stationary phase. For bioburden reduction and elimination of possible contaminants remaining on the stationary phase even after the regeneration step, a CIP step is performed. This is generally carried out with caustic soda lye.

A conventional chromatography technique is the column chromatography, in which the stationary phase (also referred to as "separation medium") is a resin placed within a column or tube. The separation mechanism is determined by the physicochemical characteristics of the resin.

The two parameters that can be tuned for the column design are the diameter of the column and the packing height of the separation medium. These determine the volume of the stationary phase, which should be selected based on the volume of the feed to be processed as well as the concentration of target component present in it and the binding capacity of the separation medium. Depending on influencing factors, such as costs of the separation medium in relation to costs for process time and/or buffer consumption, the volume of the stationary phase is selected so that 2 to 20 cycles are carried out to process the entire feed volume.

In particular, the packing height of the separation medium should be selected so that:

any inhomogeneities in the column bed and the associated reduction in efficiency, productivity and resolution of the separation are compensated for over the distance covered by the feed during column passage;

the residence time of the feed on the stationary phase required to achieve the highest possible binding capacity is achieved;

the pressure drop/the back pressure of the packed separation medium does not exceed a threshold value for a defined residence time and the resulting flow velocity. For example, if the chromatography column were packed with 3 bar packing pressure, this pressure must not be exceeded during the process, otherwise the packed bed will be compressed and a headspace (i.e. a liquid-filled cavity between the upper part of the column and the bed of the separation medium compressed by overpressure) will form in the column. This would impair the process and the separation mechanism.

The diameter of the column should be selected so that:

depending on the packing height, the amount of volume of the packed separation medium is such that the process time is as short as possible, wherein the binding capacity is directly proportional to the volume of the packed separation medium;

the costs for the required volume of separation medium do not exceed a given threshold, depending on the process time and number of cycles.

The duration of a cycle of column chromatography is usually greater than 10 minutes, often in the range of hours. For example, for a protein A column chromatography in which a feed containing antibodies is processed, if the packing height is 20 cm, the column diameter is 25 cm and the column volume is 9.8 L, a cycle takes almost four hours, as illustrated in more detail in the following table:

| Step | Volume [CV] | Flow rate [cm/h] | Residence time [min] | Duration [min] |
|---|---|---|---|---|
| (Re)Equilibration | 10 | 300 | 4 | 40 |
| Load | 26 | 400 | 3 | 78 |
| Wash 1 | 5 | 300 | 4 | 20 |
| Wash 2 | 5 | 300 | 4 | 20 |
| Wash 3 | 5 | 300 | 4 | 20 |
| Elution | 5 | 300 | 4 | 20 |
| CIP | 5 | 300 | 4 | 20 |
| Total | 61 | N/A | N/A | 218 |

The volume for each step, expressed in units of the column volume, refers to the volume of a given fluid/medium required for a given step.

An alternative to column chromatography is membrane chromatography, in which the stationary phase is given by one or more membrane adsorbers, i.e. microporous or macroporous membranes that are derivatized with functional groups similar to those on the resins. An exemplary membrane adsorber is disclosed in the European patent application EP 2274081 A1.

The residence time on the membrane adsorbers is shorter with respect to resins, because convection is primarily responsible for mass transport, leading to a more efficient adsorption with respect to the diffusion mechanism that is predominant in resins. Accordingly, the productivity of the process, i.e. the amount of product obtained per unit of feed volume and per time unit, usually expressed in g/(L*h), can be increased by a factor greater than 3 with respect to resin-based column chromatography. Further, in contrast to column chromatography, the stationary phase is almost completely utilised in the membrane chromatography.

SUMMARY

It is an object of the invention to provide a membrane chromatography system with improved process quality and efficiency, as quantified for example by one or more of the following factors: the amount of the obtained target component(s), the purity of the obtained target component(s), the amount of time needed to carry out the process and the amount of resources (such as buffers) necessary to perform the process.

The achievement of this object in accordance with the invention is set out in the independent claims. Further developments of the invention are the subject matter of the dependent claims.

According to one aspect, a chromatography system configured to process a feed fluid containing a plurality of components, wherein at least one component of the plurality of components of the feed fluid is a target component, is provided. The chromatography system comprises:

a flow path comprising a plurality of fluid control components configured to control a fluid flow;

a stationary phase, wherein the stationary phase is at least one membrane adsorber connected to the flow path and the stationary phase is configured to isolate the target component;

wherein the flow path is configured such that harvesting of the target component is optimized.

The feed fluid (also referred to as "feed") comprises a plurality of components or substances, of which at least one is a component of interest, the target component. The purpose of the chromatographic process is to harvest the target component, namely separating the target component from the other components of the feed and then collecting the target component as a product of the process.

The product is substantially made of the target component, meaning that the degree of purity, i.e. the relative amount of the target component in the overall product (e.g. by weight, mass, volume), is close to 100%, e.g. greater than 99%. The purity of the product is of particular importance for pharmaceutical and biopharmaceutical applications, for example.

The feed may comprise more than one target component to be harvested, so that the chromatographic process may yield more than one product. Further, intermediates and/or by-products may also be obtained when performing the chromatographic process and may be collected. In some cases, different concentrations of the target component may be collected separately.

The components of the feed fluid that are not of interest (also referred to as "scrap components"), as well as other substances used during the chromatographic process, such as buffers, form the waste of the process and are collected together.

Exemplarily, the feed fluid may be a solution, such as a protein-containing solution or a cell-containing solution. Examples of cell-containing solutions include vaccines or other solutions containing viruses, as well as solutions containing mammalian cells. Examples of protein-containing solutions include liquids containing therapeutic proteins (e.g. monoclonal antibodies, enzymes, hormones, etc.). In these cases, the target component may be a solute, such as a specific type of cell or a specific protein. The scrap components may include DNA, salts and host cell proteins (HCP).

The chromatography system comprises a flow path. The flow path comprises means for enabling a flow of fluid, e.g. for receiving, conveying and/or containing fluids, such as conduits and vessels, and means for regulating the flow of fluid, such as valves, pumps, sensors and filters. Accordingly, the flow path comprises in particular a plurality of fluid control components configured to control a fluid flow.

The flow path connects one or more inlet points, at which one or more fluids are led into the flow path, to one or more outlet points, at which one or more fluids are released from the flow path. The flow path may comprise different, alternative routes that connect one inlet point to one outlet point.

The direction from the inlet point(s) towards the outlet point(s) is the forward direction of the flow path and it is the general, macroscopic direction of the fluid flow. The expression "X is positioned after Y" indicates that X is after Y in the forward direction of the fluid path, i.e. X is closer than Y to the outlet point(s) and farther away than Y from the inlet point(s). Similarly, "X is positioned before Y" indicates that X is before Y in the forward direction of the fluid path, i.e. X is closer than Y to the inlet point(s) and farther away than Y from the outlet point(s).

The fluids that flow through the flow path include one or more buffers, washing fluids, the feed fluid (upstream of the stationary phase) and the separated components of the feed fluid (downstream of the stationary phase). A buffer (or "buffer solution") is an aqueous solution that efficiently resists and prevents major changes in pH following the addition of acid or base. This is due to the presence of either a weak acid and its conjugate base or a weak base and its conjugate acid. The chromatographic process may require different buffers in the different steps of a cycle.

The chromatography system comprises a stationary phase. The stationary phase is the part of the chromatography system that is configured to separate the target component(s) from the scrap components, which are initially mixed together within the feed fluid. The feed fluid, possibly mixed with other substances (e.g. water for dilution), and the buffers represent the mobile phase. In particular, the stationary phase isolates the target component in the mobile phase, which can then be collected.

Specifically, the stationary phase is one or more membrane adsorbers. In the case of a plurality of membrane adsorbers, they may be stacked on top of each other and/or may be provided in series or in parallel on two or more alternative routes of the flow path. The membrane adsorber(s) may e.g. adsorb the target component, which is later collected by means of elution. Alternatively, the target component may be obtained in flow-through, i.e. in virtue of the fact that it is not adsorbed by the membrane adsorber, while the other components of the feed fluid are.

The membrane adsorber(s) may be e.g. made of stabilised reinforced cellulose with sulphonic acid or salt-tolerant anion exchanger or phenyl as ligand. Other materials may be used for the membrane adsorber and other substances may be used as ligand. The membrane adsorber(s) may be provided in a capsule or a frame, e.g. made of plastic.

The at least one membrane adsorber is connected to the flow path. When connected to the flow path, the membrane adsorber becomes a part of the flow path, in the sense that fluids can flow through the membrane adsorber. Exemplarily, the membrane adsorber(s) may be connected to the flow path by means of valves, which are referred to as "membrane valves". For instance, a membrane adsorber (or a stack of membrane adsorbers) may be connected to the flow path by means of a pair of membrane valves, one positioned before the membrane adsorber and one positioned after the membrane adsorber. In this case, the flow path may comprise a route passing through the membrane adsorber and an alternative route not passing through the membrane adsorber. Alternatively, the membrane adsorber may be directly (i.e. without valves) connected to pipes or other conveying means of the flow path and there may be only one route passing through the membrane adsorber.

The use of membrane adsorbers as stationary phase in the chromatography system allows for greater operating flow range in comparison to column chromatography for equivalent volumes of the stationary phase. Exemplarily, the operating flow range for resins may be 0.05-2 CV/min, more preferably 0.1-1 CV/min, most preferably 0.1-0.5 CV/min, while the operating flow range for membrane adsorbers may be 0.5-40 MV/min, more preferably 1-30 MV/min, most preferably 3-20 MV/min.

The flow path of the chromatography system is configured such that harvesting of the target component by means of membrane adsorber(s) is optimized. The flow path, and in particular the fluid control components thereof, are adapted to the operation of the membrane adsorber(s). In other words, the dynamics of the fluid control within the flow path are adapted to the highly dynamic properties/behaviour of the membrane adsorber(s). In particular, the constructional/ structural design of the flow path and/or the control of the fluid flow exercised by the flow path are optimally configured for membrane chromatography.

The chromatography system may comprise or be configured to be connected to a control system, e.g. comprising a processor, configured to manage the fluid control components, such as a distributed control system. The control system may receive signals from one or more fluid control components, e.g. sensors, and may send signals to one or more fluid control components, e.g. valves and pumps.

In a particular example, the plurality of fluid control components may comprise:
  a first outlet valve connected to the at least one membrane adsorber and configured to be connected to a target component collection vessel; and
  a second outlet valve connected to the at least one membrane adsorber and configured to be connected to a waste collection vessel;
  wherein the first outlet valve and the second outlet valve have a switching time of less than about 3 seconds, preferably less than about 1 second, most preferably equal to about 0.5 seconds.

The first and second outlet valves are positioned after the at least one membrane adsorber. In particular, the first and second outlet valves may be positioned at the end of the flow path.

The first and second outlet valves are fluidly connected to the at least one membrane adsorber, in the sense that there is a flow route from the at least one membrane adsorber to each of the first and second outlet valve. In other words, a fluid can flow from the at least one membrane adsorber towards the outlet valves. For example, one or more pipes may connect the at least one membrane adsorber to the outlet valves.

In some examples, one or more other fluid control components may be interposed between the at least one membrane adsorber and the outlet valves, such as sensors and/or other valves (e.g. a membrane valve).

One of the outlet valves, e.g. the first outlet valve, is configured to be connected to a target component collection vessel, e.g. by tubing. In other words, the first outlet valve is dedicated to the discharge of the target component from the flow path into an external vessel. The second outlet valve is configured to be connected to a waste collection vessel, e.g. by tubing. In other words, the second outlet valve is dedicated to the discharge of waste (e.g. used buffers, DNA, . . . ) from the flow path into an external vessel.

Accordingly, depending on the fluid that is incoming at the outlet valves from the flow path, in particular from the at least one membrane adsorber, one outlet valve is open and the other one is closed. Each valve may switch between an open position and a closed position according to a control signal, e.g. from the control system. Exemplarily, the control signal may be based on a sensor that determines the content of the (portion of the) fluid flowing towards the outlet valves at any given time, e.g. an absorption detector such as an ultraviolet (UV) sensor positioned between the membrane adsorber and the outlet valves. If the fluid contains molecules or particles of the target component above a certain, predefined threshold, the fluid may be denoted as "target component fluid", otherwise the fluid may be denoted as "waste fluid".

The switching time of a valve is the amount of time needed for a valve to go from the open to the closed position or vice versa. Both the first outlet valve and the second outlet valve have a switching time of less than about 3 seconds, preferably less than about 1 second, most preferably equal to about 0.5 seconds. In other words, the first and second outlet valves are controlled such that they switch from an open/ closed position to a closed/open position in less than about 3 seconds, preferably less than about 1 second, most preferably equal to about 0.5 seconds.

This comparatively short switching time has two advantages in view of the high flow rate at which the membrane adsorbers are operated. Firstly, the fact that the first outlet valve can switch from closed to open in such a short time helps to eliminate or reduce a potential loss of the target component. Indeed, if the target component fluid arrives at the point in the flow path where the first outlet valve is located while the first outlet valve is still closed, a fraction of the target component fluid may not be correctly collected in the target component collection vessel.

Secondly, the fact that both outlet valves have a short switching time further reduces a potential loss of the target component and mitigates or eliminates the problem of back-mixing as well. Back-mixing refers to an undesired mixing of fluids due to a motion of the fluids in directions different from the forward direction of the flow path.

Back-mixing of fluids downstream of the membrane adsorber, in particular at the outlets, leads to an undesired mixing of the target component fluid with other fluids. This may affect the purity of the collected target component and may e.g. increase the elution volume. The elution volume is the volume of the fraction containing the target component from the start of the elution until the end of elution and should, thus, be as low as possible to increase the concentration as well as to decrease efforts for subsequent steps such as e.g. storage room, process time or buffer consumption.

The problem of back-mixing is more relevant for membrane chromatography than for column chromatography. One reason is that the volume of the stationary phase is higher for column chromatography, e.g., depending on the process design, the equivalent column volume to a membrane volume 150 mL is 10 L, so that the relative change in elution volume is negligible in column chromatography. For example, if the elution volume is 200 mL for a 150 mL membrane adsorber and the elution volume of an equivalent 10 L chromatography column is 15 L, when 50 mL of back-mixed fluid is added, the percentage increase for the membrane chromatography system is 25% and for the column chromatography system is 0.3%.

Further, due to the smaller volume of the stationary phase compared to a traditional column chromatography and the associated lower binding capacity per cycle, a higher number of membrane chromatography cycles is required with respect to the column chromatography in order to process a given volume of feed. Given the comparatively higher number of cycles, the negative effects of the back-mixing would substantially add up and make the membrane chromatographic process ineffective.

The short switching time of the outlet valves (in particular from open to closed) reduces the amount of fluid that may flow back through the valves. Further, it shortens or eliminates an overlap period in which both valves may be open, thereby enabling a faster and more exact change in the configuration of the flow path, which matches the dynamic properties of the membrane adsorber(s).

It should be noted that, in a column chromatography system, longer valve switching times are selected (i.e. about or greater than 3 seconds) in order to protect the packed column bed against rapid pressure surges.

Another measure for minimising the back-mixing is to minimise the dead volume of the system, wherein the dead volume is the volume of the flow path (i.e. the system without the stationary phase) and is, thus, given by the sum of the volumes of the conduits, of the valves and all other elements through which the fluids flow from inlet to outlet. Accordingly, exemplarily, the ratio between the dead volume and the stationary phase volume (without taking the porosity of the stationary phase into account) may be less than 5, preferably less than 4, yet preferably less than 3 and most preferably less than 2. A smaller dead volume also helps reducing the duration of a cycle.

In some examples, the fluid control components of the flow path may further comprise one or more additional outlet valves positioned after the at least one membrane adsorber. Each additional outlet valve may be dedicated to the discharge of a different component, e.g. a by-product, and may be configured to be connected to an external vessel.

The additional outlet valve(s) may also have a switching time of less than about 3 seconds, preferably less than about 1 second, most preferably equal to about 0.5 seconds.

In an alternative example, the second outlet valve may have a switching time of about 3 seconds or greater than 3 seconds, but the plurality of fluid control components may further comprise a check valve positioned after the second outlet valve. A check valve is a valve that allows fluid to flow only in one direction. In particular, the check valve only enables a fluid, such as a waste fluid, to flow towards the waste collection vessel and not in the reverse direction. The presence of the check valve alleviates or eliminates the problem of back-mixing.

In this example, the first outlet valve may have a switching time of less than about 3 seconds, preferably less than about 1 second, most preferably equal to about 0.5 seconds. Alternatively, the first outlet valve may have a switching time of about 3 seconds or greater than about 3 seconds. In this case, optionally, the plurality of fluid control components may further comprise another check valve positioned after the first outlet valve.

In a particular example, the plurality of fluid control components may further comprise:
  a first inlet valve configured to be connected to a feed fluid supply;
  a second inlet valve configured to be connected to a buffer supply;
  wherein the first inlet valve and the second inlet valve have a switching time of less than about 3 seconds, preferably less than about 1 second, most preferably equal to about 0.5 seconds.

The first and second inlet valves are positioned before the at least one membrane adsorber. In particular, the first and second outlet valves may be positioned at the beginning of the flow path.

The first and second outlet valves are fluidly connected to the at least one membrane adsorber, in the sense that there is a flow route from each of the first and second outlet valve to the at least one membrane adsorber. In other words, a fluid can flow from the inlet valves towards the at least one membrane adsorber. For example, one or more pipes may connect the at least one membrane adsorber to the inlet valves.

In some examples, one or more other fluid control components may be interposed between the at least one membrane adsorber and the inlet valves, such as pumps, filters, sensors (e.g. a UV sensor) and/or other valves (e.g. a membrane valve).

The first inlet valve is configured to be connected to a feed fluid supply, e.g. by tubing. In other words, the first inlet valve is dedicated to the input of the feed into the flow path from an external supply. The second inlet valve is configured to be connected to a buffer supply, e.g. by tubing. In other words, the second inlet valve is dedicated to the input of buffer into the flow path from an external supply. The second inlet valve may be connected to a plurality of buffer supplies, each providing a different buffer. Alternatively, the flow path may comprise a plurality of (second) inlet valves configured to be connected to a plurality of buffer supplies, respectively.

In one example, the flow path may comprise two inlet lines, one starting with the first inlet valve and one starting with the second inlet valve, wherein the two inlet lines represent two parallel branches of the flow path that meet before the at least one membrane adsorber. In the case of a plurality of second inlet valves, the flow path may comprise three or more inlet lines. In another example, the flow path may comprise a single inlet line, at the beginning of which the first and second inlet valves are positioned.

Exemplarily, the flow path may comprise at least one pump. Each inlet line may have a pump to advance the flow of the respective fluid at a defined flow rate. The pumps may particularly be integrated in the chromatography system, i.e. may be fixed elements of the flow path, in order to avoid additional dead volume due to connecting elements.

The back-mixing is not only problematic downstream of the membrane adsorber(s). Back-mixing of fluids in front of and/or on the membrane adsorber(s) would lead to a change in the properties of the fluids and, due to the small membrane volume, would reduce the binding capacity and/or the elution profile of the target component. Similarly to what explained before, also back-mixing upstream negatively affects the separation property/binding capacity of the column to a lesser extent in comparison to the membrane adsorber.

The short switching time of the inlet valves alleviates or eliminates the back-mixing issue upstream of the membrane adsorber(s). In an alternative example, the first inlet valve and the second inlet valve may have a switching time of about 3 seconds or greater than about 3 seconds and the plurality of fluid control components may further comprise at least one inlet check valve positioned after the first inlet valve and the second inlet valve. Exemplarily, if the flow path comprises at least one pump, the at least one inlet check valve may be positioned after the at least one pump.

In an example in which there is a plurality of inlet lines, there may be a corresponding plurality of check valves. In an example in which there is only one inlet line, there may be only one inlet check valve.

More generally, all the valves in the chromatography system may have a switching time of less than about 3 seconds, preferably less than about 1 second, most preferably equal to about 0.5 seconds, or, alternatively, all the valves in the chromatography system may be provided with a check valve thereafter.

In the case of a plurality of inlet lines, the flow path may further comprise a mix valve in each inlet line, e.g. a first mix valve and a second mix valve. The mix valves may prevent back-mixing between the different input fluids.

In a particular example, the plurality of fluid control components may further comprise a filter configured to filter only the feed fluid. The filter may be used in particular for particle separation and bioburden reduction, in order to avoid a block of the stationary phase. The filter may be positioned before the at least one membrane adsorber in the flow path. The filter may be positioned after an inlet valve configured to let the feed fluid into the flow path.

Exemplarily, the flow path may comprise an inlet line dedicated to the feed fluid ("feed inlet line"), i.e. used exclusively for the feed. In other words, only the feed fluid flows through the feed inlet line. The filter may be positioned directly (i.e. without valves) in this feed inlet line, so that only the feed fluid flows through the filter.

In other examples, the filter may be positioned in a part of the flow path through which different fluids flow. In this case the filter may be connected to conduits by means of two valves ("filter valves") to create a route through which only the feed may flow, while the flow path provides an alternative route for the other fluids.

The presence of a filter through which only the feed fluid flows helps reducing or eliminating back-mixing.

In a particular example, the at least one membrane adsorber has a first pore diameter and the filter has a second pore diameter, the second pore diameter being less than the first pore diameter. Exemplarily, the first pore diameter may be in the range between about 3 μm and 5 μm, while the second pore diameter may be in the range between about 0.2 μm and about 0.8 μm.

In this way, only air bubbles can reach the stationary phase which are disperse enough to flow through it unhindered and a reduction of the binding capacity is avoided. Accordingly, a bubble trap, as usually implemented in a column chromatography system can be dispensed with, thus avoiding additional dead volume.

In a particular example, the plurality of fluid control components may further comprise an absorption detector positioned after the at least one membrane adsorber, wherein a sampling rate of the absorption detector is less than about 0.7 s, preferably less than about 0.5 s, more preferably less than or equal to about 0.3 s.

As mentioned above, an absorption detector may be used to monitor the target component. For example, a UV sensor may record the absorption at a defined wavelength (e.g. 280 nm). The elution or collection of the target component is done by opening a dedicated outlet valve (the first outlet valve) controlled by this UV signal. The sampling rate of the UV sensor corresponds to the time interval between subsequent recordings of a measuring point and is directly correlated with the product recovery rate. A sampling rate less than about 0.7 s, preferably less than about 0.5 s, more preferably less than or equal to about 0.3 s ensures that yield losses are reduced or eliminated even for the high flow rates of membrane chromatography.

In a particular example, the plurality of fluid control components may further comprise an absorption detector, such as a UV sensor, positioned before the at least one membrane adsorber. The presence of an absorption detector upstream of the at least one membrane adsorber prevents malfunctioning of and/or damages to the system and enables an adaptive process control through prediction, as discussed in the following.

If the UV signal changes above/below a predetermined threshold, the process can be stopped (e.g. by stopping a pump) and the cause (e.g. inhomogeneities, microbial contamination, incorrect intermediate connected) can be eliminated. Accordingly, no product loss or change in physicochemical properties on the stationary phase occurs due to e.g. an incorrect buffer. This may also be relevant for interconnected processes, e.g. rejection of the feed fluid in case of quality deviations.

Exemplarily, if the process is stopped, the fluids present in the system may be discharged via an outlet valve different from the outlet valve dedicated to the target component, in order to avoid contamination/dilution of the already collected target component. Alternatively, all outlet valves may be closed when the process is stopped, e.g. when a pump is fully ramped down.

Similar steps can be taken in case of air ingress, e.g. despite an air sensor or in the event of failure of an air sensor. The process can be stopped and the system can be vented and/or the cause (e.g. empty buffer reservoir, loose hose connection) can be eliminated. Therefore, an excessive air input on the stationary phase can be avoided.

The UV detector further enables the system to detect immediately when the flow path upstream of the membrane adsorber(s) is free of UV-active substances. Rinsing and washing volumes can thus be optimised.

Additionally, some process parameters may be directly controlled by the upstream UV signal. For example, the residence time may be reduced or washing and elution steps may be adjusted depending on the feed concentration when the composition of the feed solution changes. In another example, the load quantity may be adjusted as a function of the UV signal in the event of production-related fluctuations in the membrane adsorber (by means of prior input of the binding capacity and/or titre of the target component in the feed), e.g. in the first cycle or during perfusion.

If, for example, the concentration of a continuously operated perfusion bioreactor changes, this is recorded by the UV sensor before the stationary phase and can be processed (e.g. by algorithms, multiple linear regression, neural networks or artificial intelligence) and the process parameters can be adjusted to the changed conditions. This ensures the safety of the chromatographic process and/or flags possible deviations at an early stage.

If there is a UV sensor after the membrane adsorber(s), a comparison of pre-membrane-adsorber and post-membrane-adsorber UV signals may provide an assessment of the quality of the separation process. It may further enable an adaptive, automated process control, e.g. a variable regeneration step or CIP step based on a decrease in the yield as seen by comparing the peak areas before the membrane adsorber and after the membrane adsorber.

The pre-membrane UV sensor further provides a function of filter monitoring, in case a filter is present. For example, if the UV signal changes significantly within a given timespan, this suggests a change in feed composition or filter rupture/defect. In this case, the downstream fluid is pumped into the waste, the process is interrupted and the filter may be replaced.

Moreover, if a filter is installed in an inlet line dedicated to the feed fluid, a two-stage chromatography may be possible with the system. The first stage is given by the filter and the UV sensor before the membrane adsorber(s), while the second stage is given by the membrane adsorber(s) and the UV sensor thereafter.

Finally, the pre-membrane UV sensor could provide a control function for a comparable system.

Generally, this system configuration with sensor technology prior to the stationary phase enables integrated process control along the entire value chain.

The characteristics of the chromatography system, in particular of the flow path, illustrated above improve the chromatographic process in terms of efficiency and quality. Exemplarily, the membrane chromatography system heretofore described is particularly suitable for performing rapid cycling chromatography, e.g. with cycles having a duration between about 3 minutes and about 8 minutes with residence times between about 10 seconds and about 60 seconds, in view of the highly dynamic control of the fluid flow in the flow path and the minimized dead volume.

BRIEF DESCRIPTION OF THE DRAWINGS

Details of exemplary embodiments are set forth below with reference to the exemplary drawings. Other features will be apparent from the description, the drawings, and from the claims. It should be understood, however, that even though embodiments are separately described, single features of different embodiments may be combined to further embodiments.

DETAILED DESCRIPTION

In the following, a detailed description of examples will be given with reference to the drawings. It should be understood that various modifications to the examples may be made. Unless explicitly indicated otherwise, elements of one example may be combined and used in other examples to form new examples.

Figure 1:
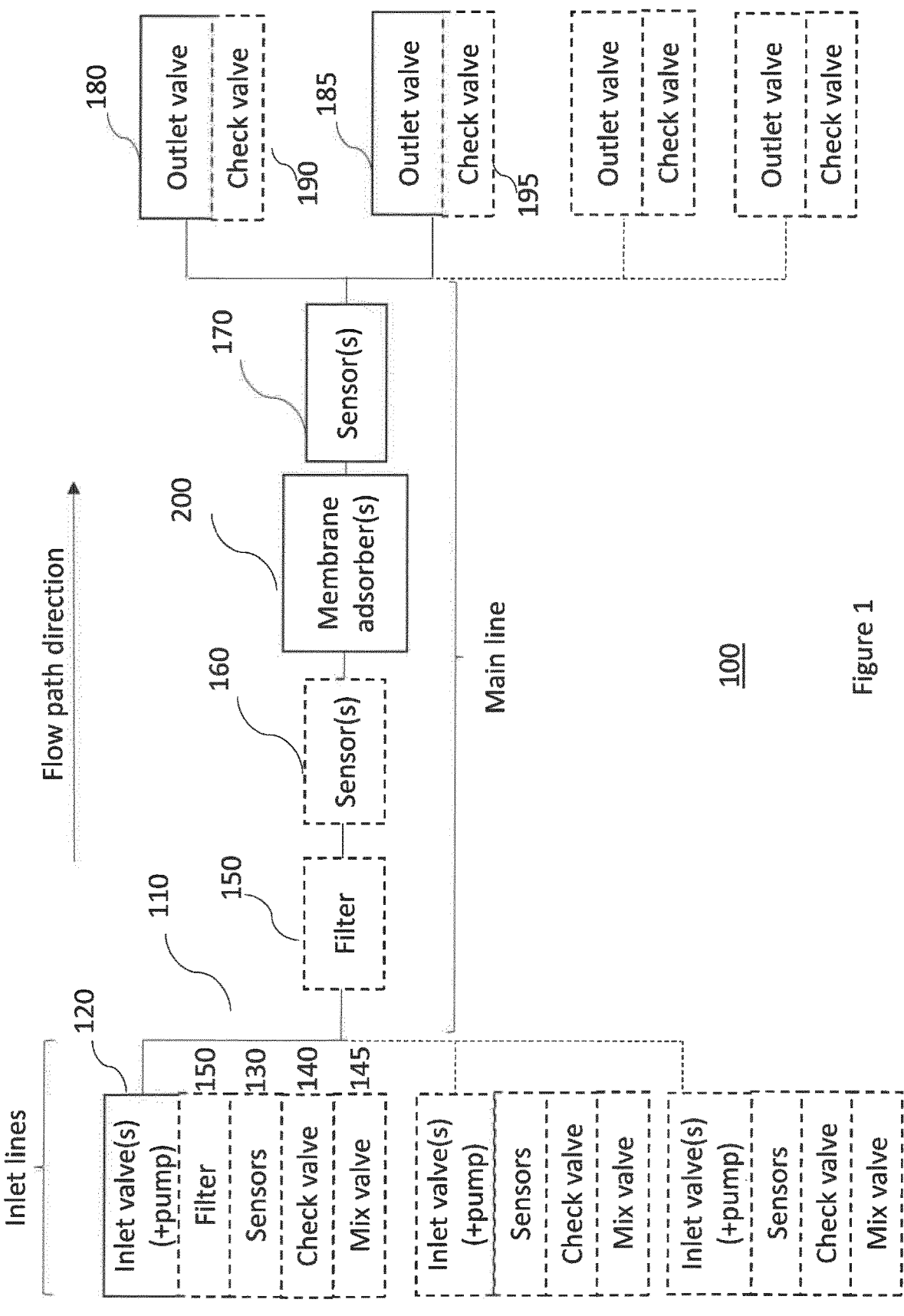
FIG. 1 shows a conceptual representation of an exemplary chromatography system.

FIG. 1 shows a conceptual representation of an exemplary chromatography system 100. The chromatography system 100 comprises a flow path 110 and at least one membrane adsorber 200 as stationary phase. The flow path 110 comprises conduits such as pipes and/or tubing in which fluids can flow and it comprises a plurality of fluid control components configured to regulate the flow of the fluids. The chromatography system 100 comprises a control system (not shown) configured to manage at least part of the fluid control components. The chromatography system 100 may in particular be suitable for membrane chromatography in bind and elute mode.

Figure 2:
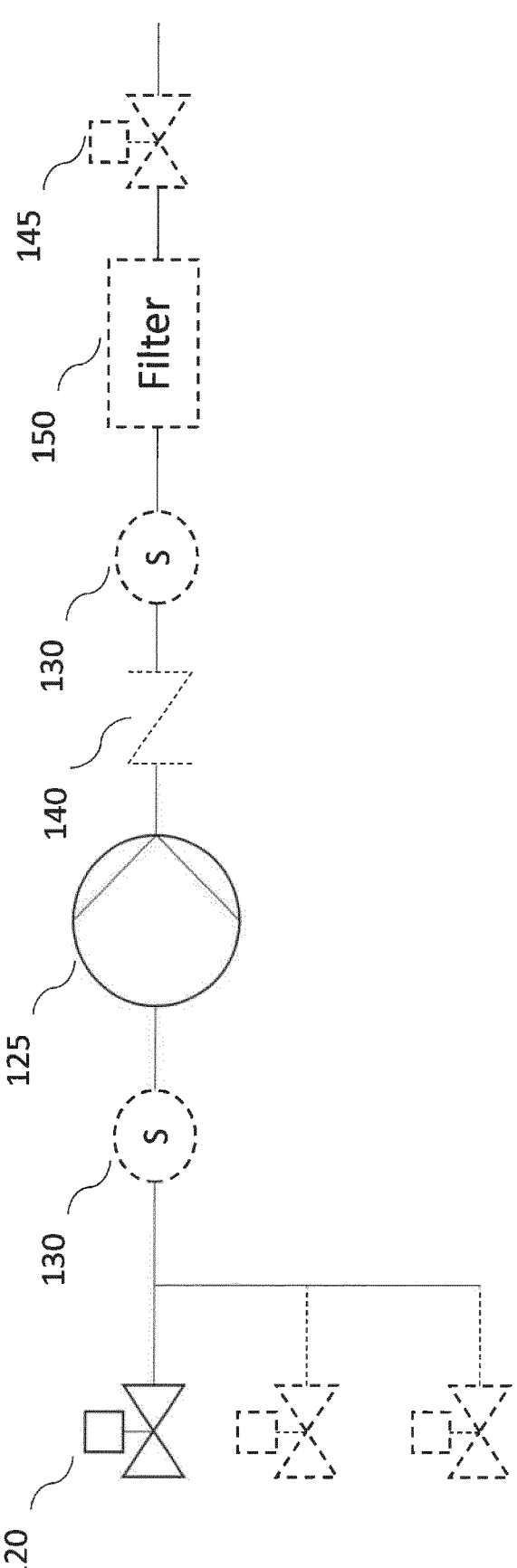
FIG. 2 shows a conceptual representation of an inlet line in a flow path.

The dashed elements in FIGS. 1 and 2 are optional. The flow path 110 may comprise one or more inlet lines at the beginning, wherein, in case of a plurality of inlet lines, the inlet lines conjoin into a main line. An exemplary inlet line, as shown in more detail in FIG. 2, comprises at least one inlet valve 120 configured to lead an input fluid, such as the feed fluid, a buffer or a washing fluid, into the flow path. In case the flow path 110 comprises only one inlet line, the inlet line comprises at least two inlet valves 120, one dedicated to the feed fluid and the other for other input fluids. Each inlet valve 120 is configured to be connected to at least one input fluid supply.

The inlet line further comprises a pump 125 and, between the inlet valve(s) 120 and the pump 125, an air sensor 130 configured to detect air in the inlet tubing may be installed. After the pump 125, the inlet line may comprise a check valve 140, e.g. if the switching time of the inlet valve(s) 120 is about 3 seconds or greater than about 3 seconds. After the check valve 140, other sensors 130 may be installed, such as a pressure sensor and a flowmeter, for monitoring the inlet line.

If the inlet line is a line dedicated for the feed fluid, the feed inlet line may comprise, after the sensors 130 following the pump 125, a filter 150 configured to filter the feed fluid in order to e.g. eliminate some particles. In particular, the filter may be directly inserted in the feed inlet inline, i.e. without valves. Alternatively, the filter 150 may be positioned in the main line. An analysis of the effects of the filter position is provided below with reference to FIGS. 7 to 10.

If the flow path comprises a plurality of inlet lines, each inlet line may comprise at the end, i.e. before joining the main line with the other inlet lines, a mix valve 145. The provision of mix valves separates the different fluids from one another and prevents back-mixing, as also discussed with reference to FIG. 10 below.

Going back to FIG. 1, the flow path 110 comprises a main line, after the inlet line(s), to which the membrane adsorber (s) 200 are connected. In one example, a single membrane adsorber 200 or a stack of membrane adsorbers 200 on top of each other may be connected to the flow path 110. In another example, two membrane adsorbers 200 or two stacks of membrane adsorbers 200 may be connected in parallel to the flow path 110. The use of two membrane adsorbers 200 or two stacks in parallel may allow a combination of capture and flow-through modes or an augmentation of the membrane volume and, thus, of the binding capacity. The term "membrane volume" refers to the volume of a single membrane adsorber 200 or a stack of membrane adsorbers 200 considering the porosity. For example, a membrane volume of 1 L may be the result of 200 mL of membrane layers and 800 mL of porosity.

The membrane adsorber(s) 200 may be connected to the flow path 110 by means of (membrane) valves. The main line may branch into a route on which there is no membrane adsorber 200 and one or two routes to which membrane adsorber(s) 200 can be connected.

The main line of the flow path 110 may comprise a filter 150 upstream of the membrane adsorber(s) 200, if the filter 150 is not positioned in the feed inlet line. The filter 150 may be connected to the flow path by means of (filter) valves. Thus, the main line may have two alternative branches, one with the filter 150 and one without the filter 150.

The main line of the flow path 110 may comprise one or more sensors 160 before the membrane adsorber(s) 200 (and after the filter 150, if present). In particular, a UV sensor may be positioned before the membrane adsorber(s) 200 to provide a monitoring function and to enable an adaptive control of the system. Other sensors 160 may include a pressure sensor, a conductivity sensor and a pH sensor.

The main line of the flow path 110 comprises one or more sensors 170 after the membrane adsorber(s) 200. In particular, at least a UV sensor 170 is positioned between the membrane adsorber(s) 200 and the outlet valves, wherein the UV sensor is configured to detect whether the fluid coming from the membrane adsorber(s) 200 contains the target component and should, thus, be directed towards a product collection vessel or towards other outlets, e.g. waste. Other sensors 170 may include a pressure sensor, a conductivity sensor and a pH sensor.

A signal generated by the UV sensor 170 is used by the control system to control the outlet valves positioned at the end of the flow path after the UV sensor 170. A sampling rate of the UV sensor 170 may be less than about 0.7 s, preferably less than about 0.5 s, more preferably less than or equal to about 0.3 s. A discussion of the sampling rate is given with reference to FIGS. 5 and 6 below.

The flow path 110 comprises at least two outlet vales 180 and 185 and optionally additional outlet vales, wherein each outlet valve is configured to be connected to a collection vessel. Outlet valve 180 may be connected to a target component collection vessel (and, thus, be denoted as "target component outlet valve") while outlet valve 185 may be connected to a waste collection vessel (and, thus, be denoted as "waste outlet valve").

The flow path 110 may comprise a check valve 195 after waste outlet valve 185, if the switching time of the waste outlet valve 185 is about 3 seconds or greater than about 3 seconds. In some examples, the flow path 110 may comprise a check valve after each outlet valve, respectively, if the switching time of the corresponding outlet valve is about 3 seconds or greater than about 3 seconds.

For the design of the chromatography system the portion of the flow path between the (post-membrane) UV sensor 170 and the output valves is of particular relevance. The maximum membrane volume $V_{MA}$ that can be operated without loss is coupled with the volumetric flow rate and, for fast non-kinetically limited stationary phases, the chromatography system may be designed accordingly. This relationship can be derived from the following equations (1) to (4):

$$\dot{V} = u \cdot A \tag{1}$$

$$A = \frac{\pi}{4} \cdot d^2 \tag{2}$$

$$V = A \cdot L \tag{3}$$

$$u = \frac{L}{t_{tot}} \tag{4}$$

where $\dot{V}$ is the maximal volumetric flow rate with no loss, d is the diameter and L is the length of the pipe between the UV sensor 170 and the output valves, and $t_{tot}$ is the total signal transmission time. The total signal transmission time consists of all time delays in signal transmission from the moment the UV sensor detects the passage of the target component until the signal is executed, i.e. until the target component outlet valve 180 is opened. Equation (5) shows an exemplary decomposition of $t_{tot}$ in time needed by the control system for the signal transmission, sensor sampling rate and valve switching time:

$$t_{tot} = t_{cont} + t_{samp.rate} + t_{switch}. \tag{5}$$

The maximal volumetric flow rate $\dot{V}$ can be expressed as number of membrane volumes per unit of time $\dot{V} = MV \cdot V_{MA}$.

Figure 3:
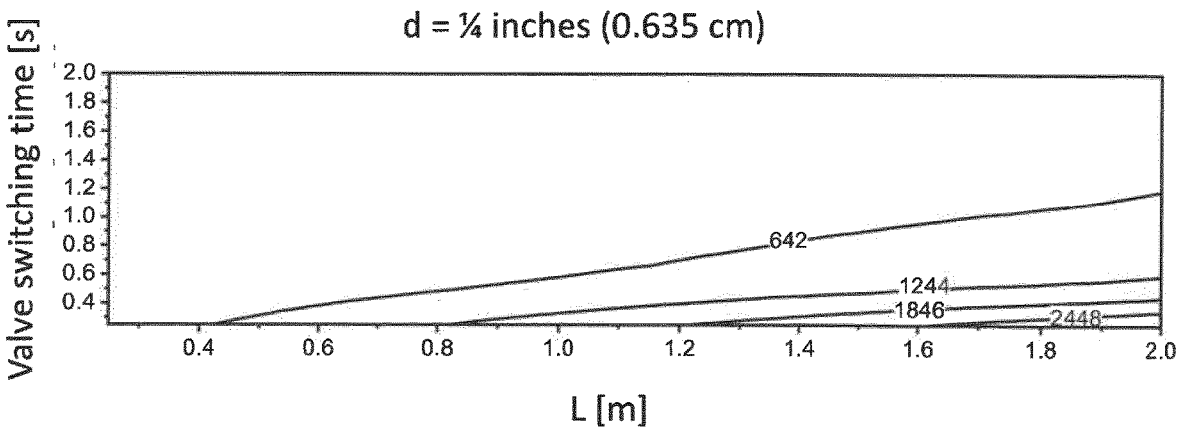
FIG. 3 shows plots of the maximum volume of the membrane adsorber for which there is no loss of product as a function of some features of the flow path.
Figure 3:
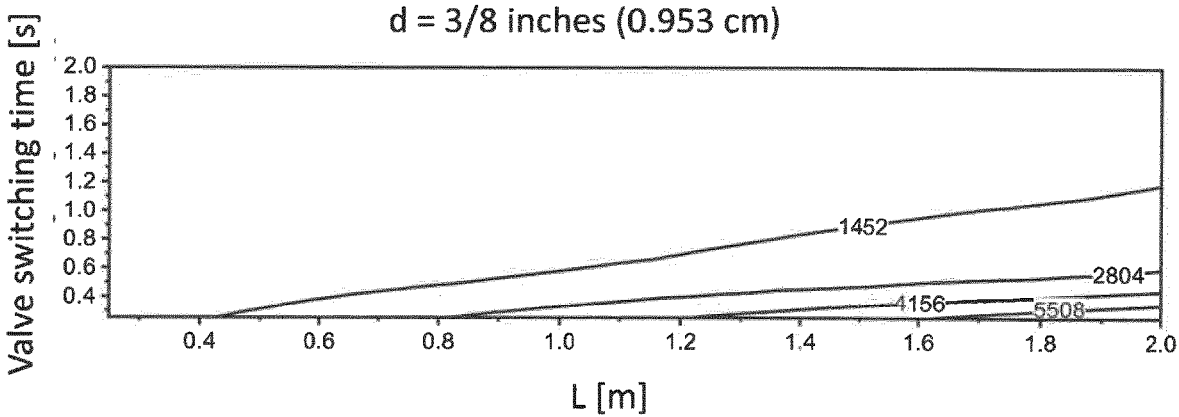
Figure 3:
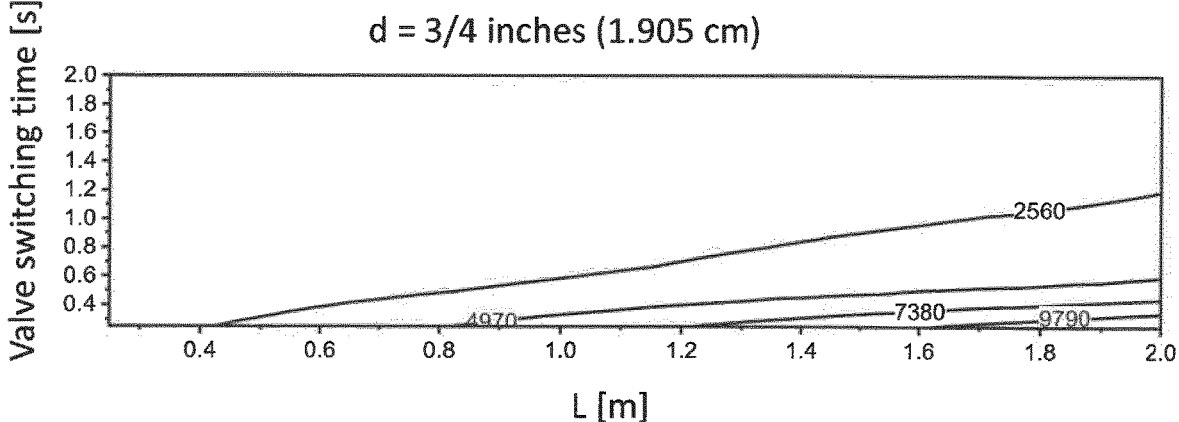

FIG. 3 shows the maximum membrane volume for which there is no loss of product as a function of the pipe diameter d, the pipe length L and the target component outlet valve switching time $t_{switch}$, for a volumetric flow rate of 5 membrane volumes per minute (MV=5/min).

With increasing valve switching time and decreasing pipe length, the maximum possible volume $V_{MA}$ is reduced. With increasing pipe diameter, higher maximum volumes of the stationary phase can be achieved with shorter tube lengths due to the reduced flow velocity.

Assuming 0.25 s for $t_{cont}$ at MV=5/min and a pipe length of 0.25 m, the following table shows the maximum stationary phase volume $V_{MA}$ before product loss occurs as a function of $t_{tot}$. As the total signal transmission time increases, the usable stationary phase volume and, thus, the operating range of the system without product loss are reduced.

| $t_{tot}$ [s] | $t_{switch}$ [s] | $t_{samp\cdot rate}$ [s] | $V_{MA}$ [mL] |
|---|---|---|---|
| 0.25 | 0 | 0 | 855 |
| 0.55 | 0 | 0.3 | 388 |
| 1.25 | 0 | 1 | 171 |
| 1.05 | 0.5 | 0.3 | 204 |
| 3.55 | 3 | 0.3 | 60 |
| 1.75 | 0.5 | 1 | 122 |
| 4.25 | 3 | 1 | 50 |

From all the considerations above it can be seen that there is an interplay between the variables $t_{tot}$, L, d, MV when it comes to minimizing or eliminating product loss for a given membrane volume. Accordingly, an optimisation routine may be applied, such as $$\text{Max}\left(V_{rel\cdot Ma}\cdot\frac{1}{V_{rel}}\right) = f(t_{tot}, L, d, MV) \tag{6}$$

which can then be used to solve for the optimum, for example by multiple linear regression or other systems of equations. $V_{rel,MA}$ is the membrane volume and $V_{rel}$ is the dead volume of the flow path or of the whole system (e.g. including the empty volume of a capsule housing the membrane adsorber). When their ratio is maximised, the result of the chromatographic process is mostly influenced by the characteristics of the chromatographic stationary phase, e.g. membrane adsorber. The smaller their ratio is, the stronger is the influence of the flow path.

Figure 4:
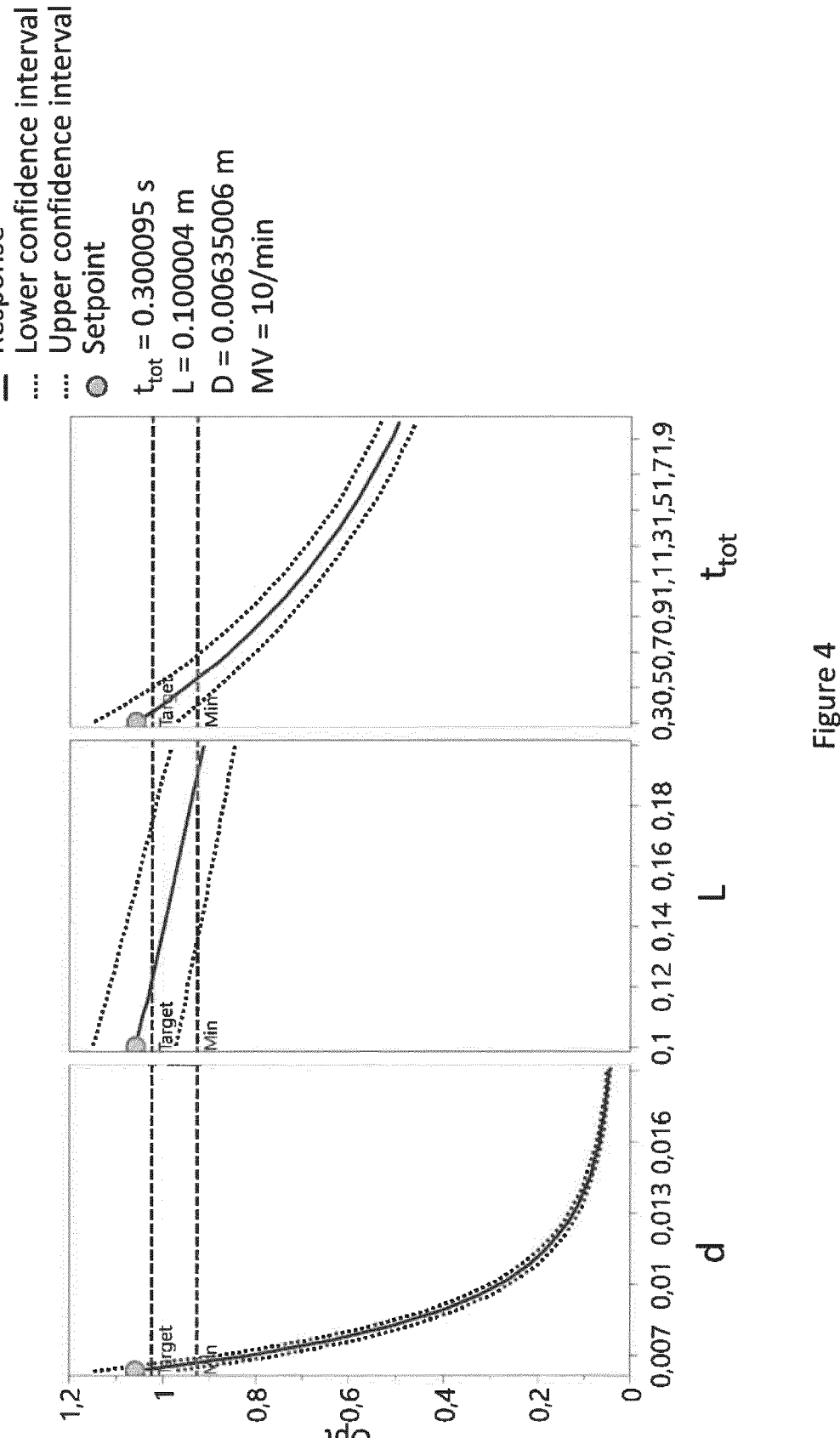
FIG. 4 shows an optimisation routine for determining the optimal switching time.

FIG. 4 shows an optimisation routine for determining the optimal switching time with respect to the pipe length/diameter and $t_{tot}$ and thus the applicable stationary phase volume.

Figure 5:
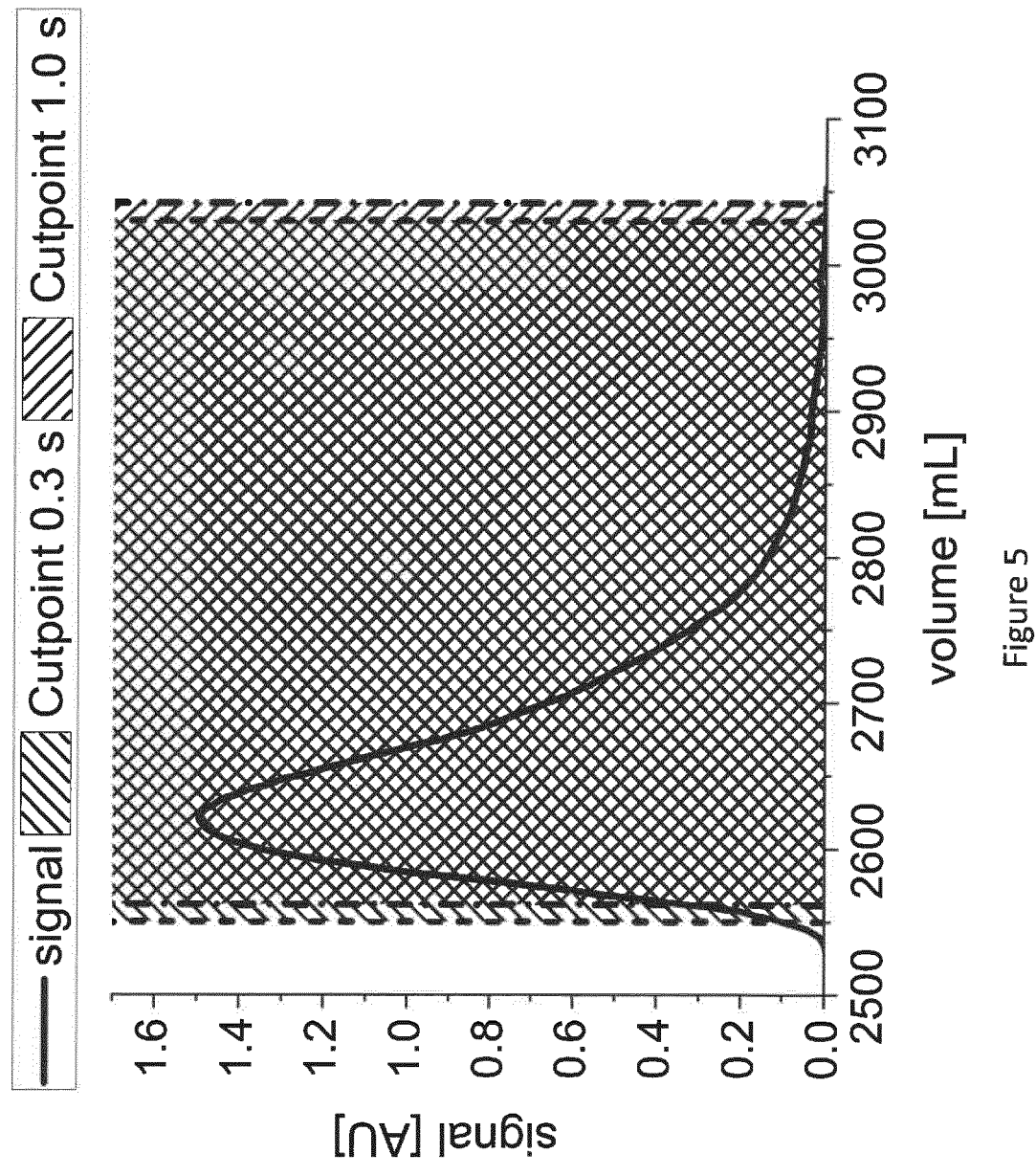
FIG. 5 shows a plot of a UV detection signal vs volume for different sampling rates of a UV filter in the chromatography system.
Figure 6:
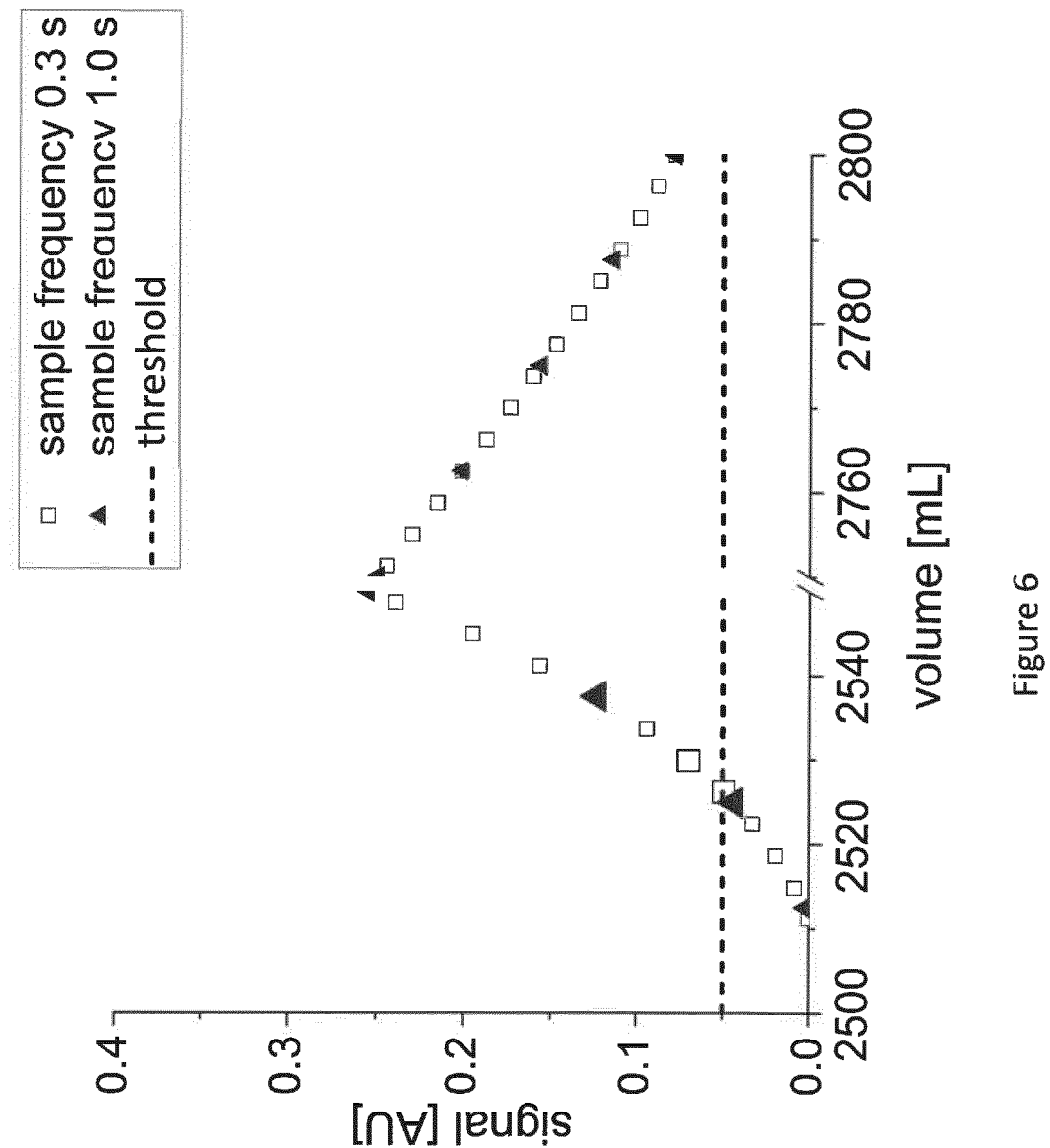
FIG. 6 shows an enlarged plot of a UV detection signal vs volume for different sampling rates of a UV filter in the chromatography system.

As discussed above, the sampling rate plays a role, in combination with other parameters, in optimizing the system to avoid product loss. FIGS. 5 and 6 illustrate the effect of the sampling rate alone on the performance of the chromatography system.

FIG. 5 shows a plot of a UV detection signal vs volume for different sampling rates of a UV filter in the chromatography system.

As mentioned before, the presence of the product/target molecule downstream the membrane adsorber is usually detected by checking whether a given condition ("valve switching condition") is satisfied, i.e. that the absorption at a defined wavelength (e.g. 280 nm) is above a given threshold, e.g. 0.05 AU. As long as the absorption detected e.g. by a UV sensor is above the threshold, the product is collected by maintaining the target component outlet valve 180 open.

FIG. 5 shows an elution peak for BSA obtained with Sartobind® Q and shows the cut points on the elution curve for two different scanning rate values, namely 1 s and 0.3 s. The cut points are the points at which the UV sensor "realizes" that the absorption has crossed the threshold.

For different scanning rate values the cut points occur at different times/volumes and the difference is clearly shown in the enlarged FIG. 6. Although the condition is met already at about 2525 mL, the UV sensor detects it with a delay in both cases. However, for a flow rate of 45 L/h, with the faster sampling rate the detection occurs after less than 4 mL, while with the sampling rate of 1.0 s it takes place after more than 12 mL. Higher flow rates would lead to higher volume distances between the cut points.

The hatched regions indicate the volume interval during which the product is collected. Considering the difference between the integral of the whole elution peak and of each hatched fraction thereof, respectively, it is possible to calculate the product loss.

| Sampling Rate [s] | Loss [%] |
|---|---|
| 0.3 | 0.1 |
| 1.0 | 1.1 |

Accordingly, the reduction of the scanning rate results in the reduction of product loss.

Besides the sampling rate, another parameter that has been considered in combination with others with reference to FIGS. 3 and 4 is the switching time of the target component outlet valve 180. The effect of the valve switching time, taken alone, on the performance of the chromatography system is illustrated in the following with reference to five tests.

A product elution is simulated in tests 1, 2 and 3 with water and water/acetone (2-5% v/v), since acetone, like proteins, absorbs light at a wavelength of 280 nm and is therefore suitable as a model. In test 4 and 5, the analysis is performed using a Sartobind® Q loaded with 1 L bovine serum albumin (BSA) (c=3 g/L) eluted with 0.5 M NaCl. The valve switching condition is 0.1 AU for all experiments. Each test was performed at least 3 times and appropriate fractions were drawn and analysed, the results are shown in the following table.

| Test number | Mean [AU] [g/L] | Standard deviation [AU] [g/L] | Relative deviation [%] |
|---|---|---|---|
| 1 | 0.161 AU | 0.054 | 33.4 |
| 2 | 0.890 AU | 0.028 | 3.1 |
| 3 | 0.708 AU | 0.021 | 3.0 |
| 4 | 9.7 g/L | 0.400 | 4.0 |
| 5 | 9.7 g/L | 0.300 | 3.3 |

In tests 1 and 2 the switching time of outlet valves 180 and 185 was set to about 3 s. In test 2, a check valve 195 was positioned after the waste outlet valve 185. In tests 3, 4 and 5 the switching time of outlet valves 180 and 185 was set to about 0.5 s.

In comparison with tests 2 and 3, test 1 shows a significantly lower mean signal strength of the collected fractions. Furthermore, the deviation among the extracted fractions is with 33.4% the highest of all tests. The implementation of the check valve 185 leads to a significantly higher concentration of 0.890 AU and a relative deviation of 3.1%, which is significantly lower with respect to test 1. A comparable performance with test 2 is seen for tests 3, 4 and 5.

Therefore, the valve switching times have a considerable influence on the reproducibility and product concentration, wherein lower switching times are better. However, the valve switching time should not be too low, i.e. too close to 0 s, due to safety aspects such as pressure development in the system when pumping liquids at high volumetric flows. Hence, a valve switching time of less than about 3 seconds, preferably less than about 1 second, most preferably equal to about 0.5 seconds may be selected in order to reduce back-mixing and product loss.

Accordingly, the outlet valves 180 and 185 as well as optional additional outlet valves of the system 100 are set to have a switching time of less than about 3 seconds, preferably less than about 1 second, most preferably equal to about 0.5 seconds. Alternatively, the outlet valves 180 and 185 may have a switching time of about 3 seconds or more and at least the waste outlet valve 185 may have a check valve 195 positioned after it. If additional outlet valves are present, they may also have a check valve positioned thereafter. Optionally, also the target component outlet valve 180 may have a corresponding check valve 190.

Further, the input valves 120 may be controlled to have a switching time of less than about 3 seconds, preferably less than about 1 second, most preferably equal to about 0.5 seconds. Alternatively, the input valves 120 may have a switching time of about 3 seconds or more and each inlet line may comprise a check valve 140. The same concept applies to all valves in the flow path 110 of system 100.

Another aspect that may be considered in the design of the system is the position of the filter 150, if present. Depending on the position of the pre-filter, there are differences in the back-mixing, which are discussed below.

Figure 7:
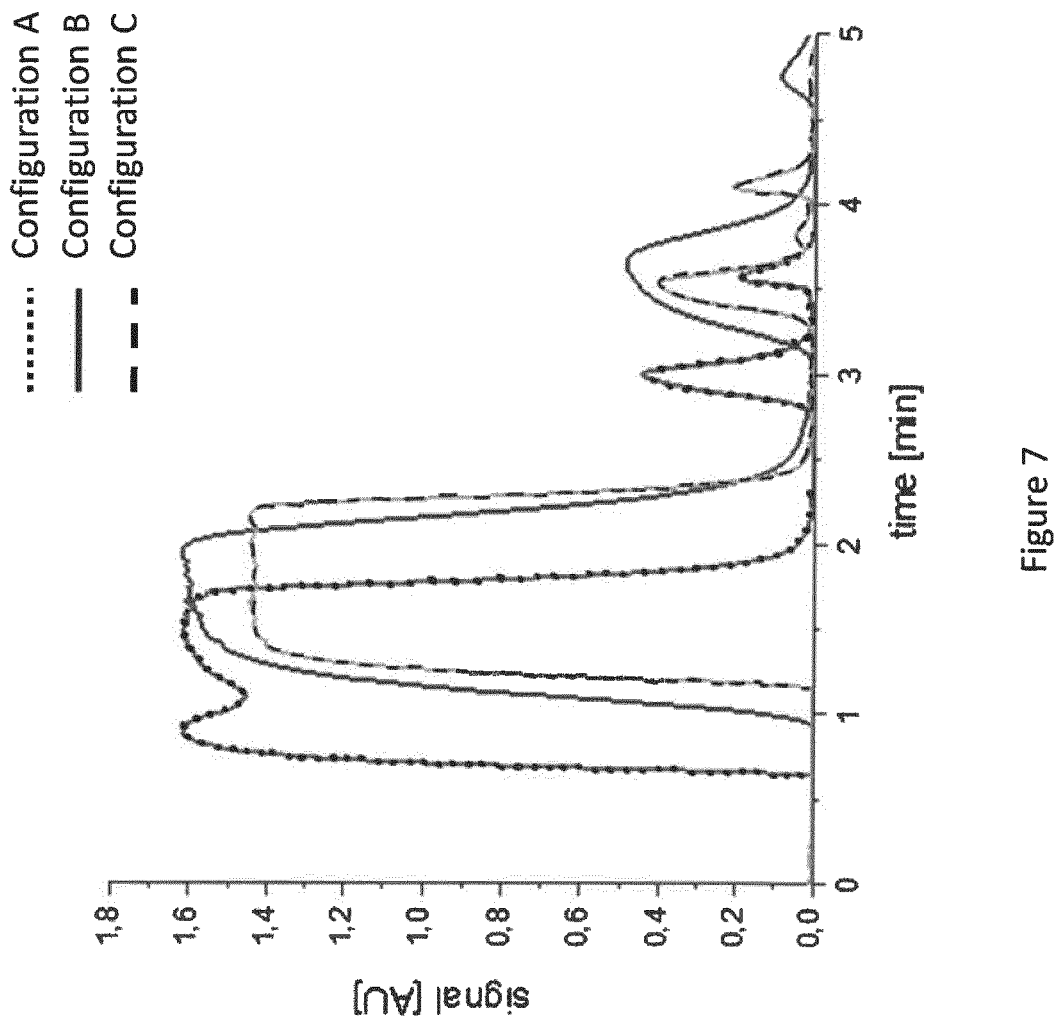
FIG. 7 shows a plot of a UV detection signal vs time for different configurations of a filter in the chromatography system.

FIG. 7 shows a plot of a UV detection signal vs time for different configurations of a filter in the chromatography system. The three configurations are as follows:

A) Filter connected to the main line by means of filter valves with a switching time of about 3 s, flow-through of feed fluid only (dotted line)

B) Filter directly inserted in the main line, flow-through of all fluids (solid line)

C) Filter directly inserted in the feed fluid inlet line (dashed line)

The same test procedure is performed with each configuration, wherein the test procedure is structured as follows: equilibration with water, loading with a 2-5% (v/v) water/acetone mixture, washing with water, a factitious elution and regeneration with water. The elution is carried out by gradually increasing the water/acetone mixture until a signal of 0.2 AU is reached, then regeneration is initiated.

Configuration A shows a dip in the signal at about 0.8 minutes. In the further course of the test the elution peak is identified at minute 3 and at minute 3.7 a further peak is identified. The drop in concentration during the loading process can be explained by back-mixing at the filter between feed solution and water, due to the volume of piping between the pumps and the filter as well as the switching time of the filter valves. This mixing leads to unwanted dynamic concentration profiles in the loading step, which negatively influence the binding characteristics of the stationary phase.

In the case of configuration B, the signal does not exhibit a reduction during loading but it does not reach a constant value. The elution peak is clearly wider than the one of configuration A and a second peak is visible also here. Since all fluids go through the filter, each fluid mixes with the residuals of the previously filtered fluid(s). This intermixture leads to a change in concentration that negatively affects the performance of the system.

For configuration C, the signal shows a steep rise in the loading phase and a sharp peak in the elution phase. A second peak is identified also here. All considered, this configuration shows the best results for fluid dynamics/back-mixing: the signal is stable at all times and shows a narrow elution peak.

While configuration C has the lowest back-mixing volume, configuration A has the option to have inline dilution in the system, while also having a narrow peak. The performance of configuration A can be improved by reducing the switching time of the filter valves, as shown in FIG. 8.

Figure 8:
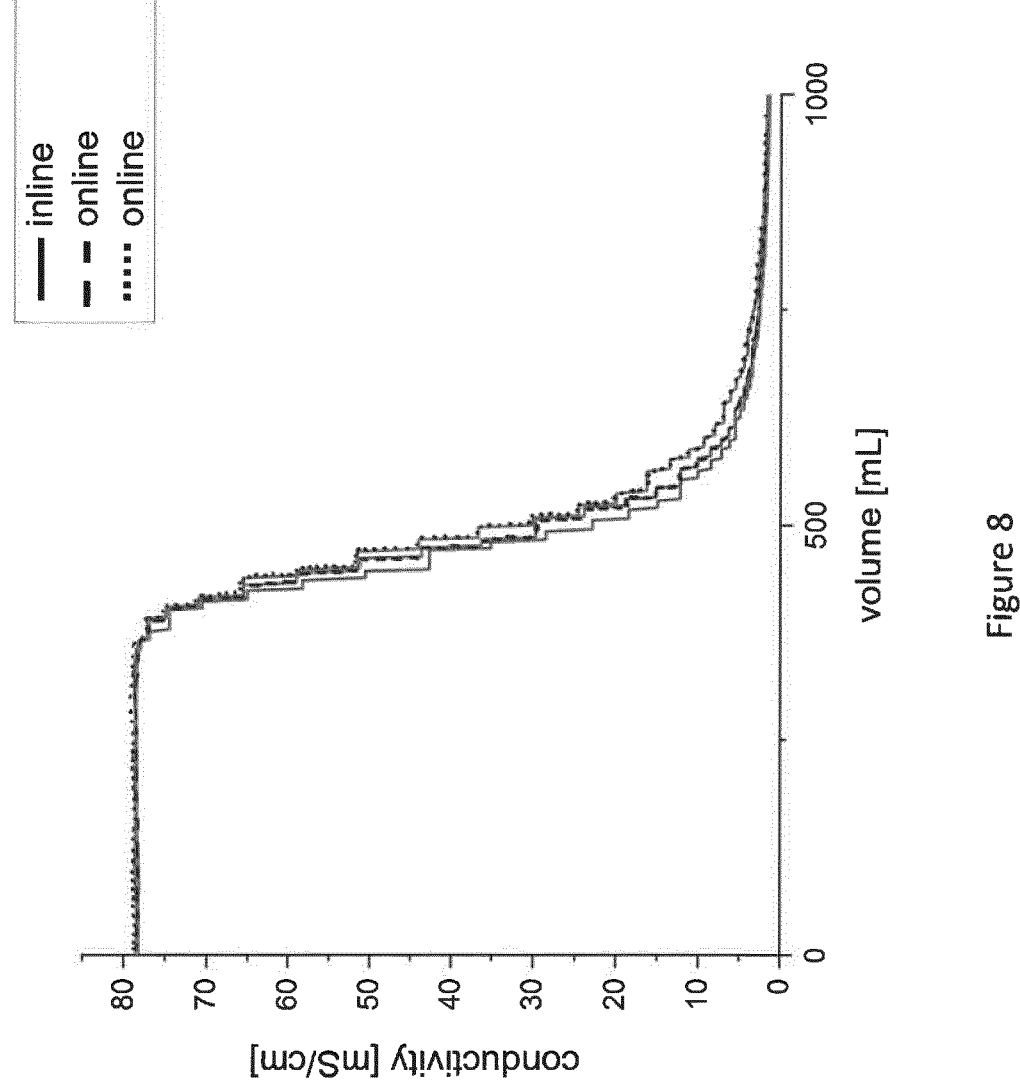
FIG. 8 shows a plot of a conductivity signal vs volume for different configurations of a filter in the chromatography system.

FIG. 8 shows a plot of a conductivity signal vs volume for different configurations of a filter in the chromatography system. In particular, the solid line represents configuration C, in which the filter is installed directly in the feed inlet line (also referred to as "inline filter"). The dashed line represents configuration A, in which the filter is connected to the main line by two filter valves (also referred to as "online filter"), with the modification that the filter valves have a switching time of about 0.5 s. Finally the dotted line also represents a configuration with an online filter and switching time of about 0.5 s.

All the curves have been obtained by sending different water and water/acetone mixtures through the respective filter positions at 45 L/h. It can be seen that the performance of the online filter with a valve switching time of 0.5 s is comparable to that of the inline filter. This is also visible in FIG. 9, which shows a plot of conductivity normalized area vs signal area centroid normalized volume for the inline filter and the online filter.

The less satisfactory performance of configuration B with respect to configuration C can be explained theoretically by using the equilibrium dispersive model expressed by equation 7 below, wherein $c_i$ is the concentration of a component in the feed fluid, $u_{int}$ is the linear velocity of the feed fluid and $D_{ax}$ is the coefficient of axial dispersion, which is the sum of the axial molecular diffusion and the eddy diffusion contribution.

In the general rate or equilibrium dispersive model the concentration changes with the time and here is calculated by the concentration change over the length (i.e. the dimension in the flow direction). Furthermore, the concentration change with the time is divided into convective and diffusive/dispersive mass transfer. The convective term describes the concentration flow to the next length section by the linear velocity and the length change. The diffusive/dispersive mass transfer is described by the axial dispersion coefficient. The axial dispersion dimension/effect is described by the value of the axial dispersion coefficient and the change of concentration through the cross sectional area represented by the second derivative of the concentration with respect to the length, comparable to the second Fick's law. The second derivative of the concentration with respect to the length represents the back-mixing.

In other words, the change in concentration over time results from the convective transport via the linear velocity as well as the back-mixing via the axial dispersion coefficient. More precisely, the longer the volume is flowed by a fluid, the higher is the influence of the back-mixing. The locally-considered concentration change $\partial^2 c_i$ increases with the increase of the sum of the temporal concentration change over the quotient of the length and axial dispersion coefficient, as shown by equation 8.

$$\frac{\partial c_i}{\partial t} = -u_{int} \cdot \frac{\partial c_i}{\partial x} + D_{ax} \cdot \underbrace{\frac{\partial^2 c_i}{\partial x^2}}_{1} \tag{7}$$

$$\frac{\partial c_i}{\partial t} \cdot \frac{\Delta x^2}{D_{ax}} = \partial^2 c_i \tag{8}$$

c=concentration of $i^{th}$ component [g/L/M]

t=time [s]

u=linear velocity [mm/s]

x=longitudinal coordinate [mm]

$D_{ax}$=axial dispersion coefficient [mm²/s]

If the filter is permanently exclusively flowed through by the feed, as in configuration C, the back-mixing in the system is significantly reduced, as the concentration change $\partial c_i/\partial t$ is 0 within the filter.

If the filter is not installed directly in the inlet line used exclusively for the feed, it should be only flowed through by the feed. Further, it should be permanently, i.e. during the whole cycle, filled with feed. Therefore, the switching time of the filter valves would have to be adjusted by the volume that the feed travels back to the filter valve, in order to avoid concentration gradients.

Figure 10:
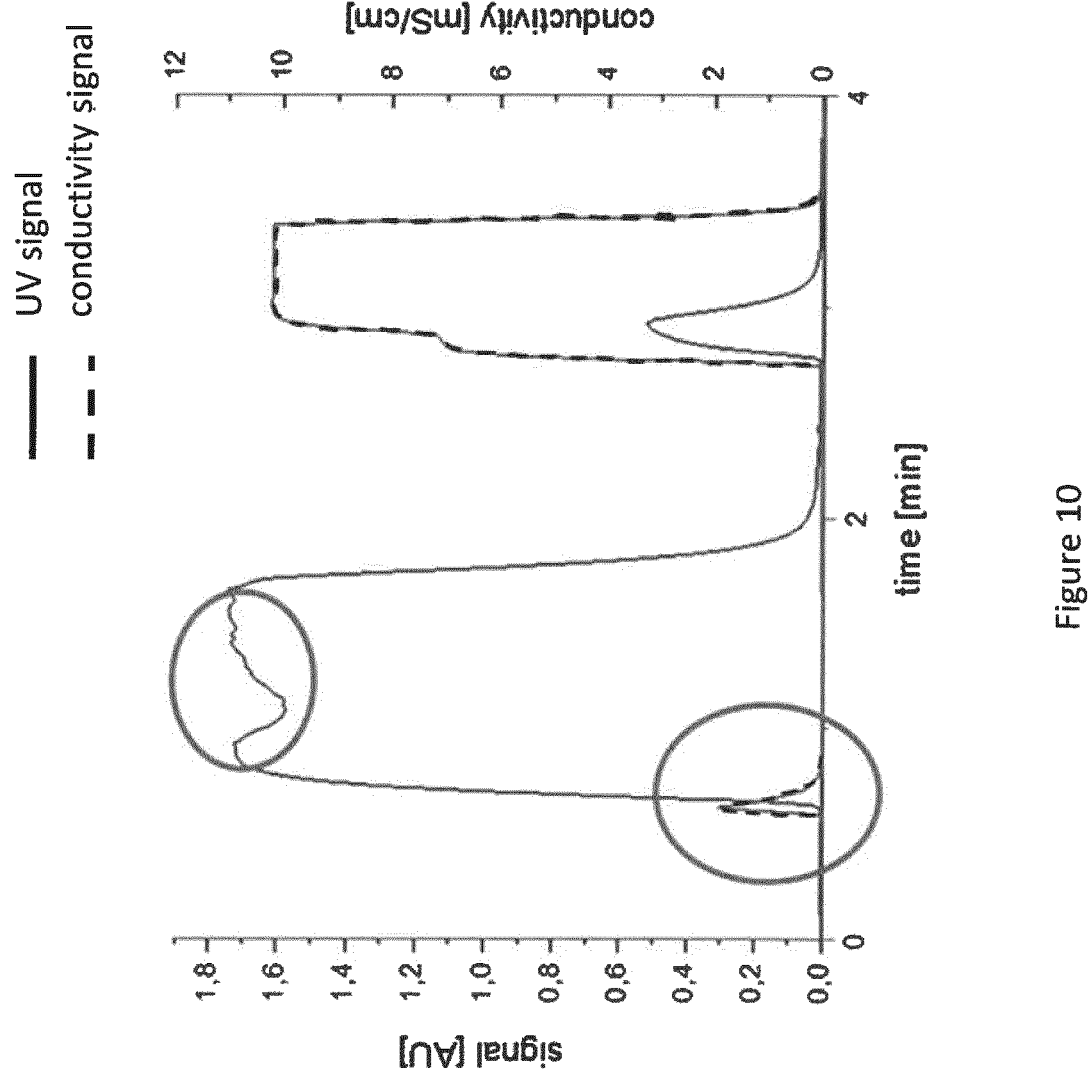
FIG. 10 shows a plot of a UV detection signal and a conductivity signal vs time for different configurations of a filter in the chromatography system.

In all configurations A, B and C a second elution peak is detected, as shown in FIG. 7. FIG. 10 shows the conductivity signal (dashed line) in addition to the UV signal (solid line) for configuration A. The conductivity signal features a small peak at the beginning of the loading, a salt signal, which reduces the binding capacity of the stationary phase. This undesirable behaviour occurs due to the merging of a plurality of inlet lines without efficient prevention of back mixing.

The provision of a mix valve 145 on each inlet line creates a dedicated mixing point and separates the different media from each other, so that the concentration gradient is 0 up to the mixing point, which means that back-mixing cannot take place (see equation 7). In the case of an online filter, the presence of mix valves also allows a reduction of the distance between the point at which the inlet lines meet and the position of the filter.

A further measure to reduce back-mixing concerns the general structure of the flow path from inlet to outlet. A flow path in which bends and turns are minimized, or, in other words, a flow path that is as straight as possible reduces the dead volume of the flow path and, thus, back-mixing.

Figure 11:
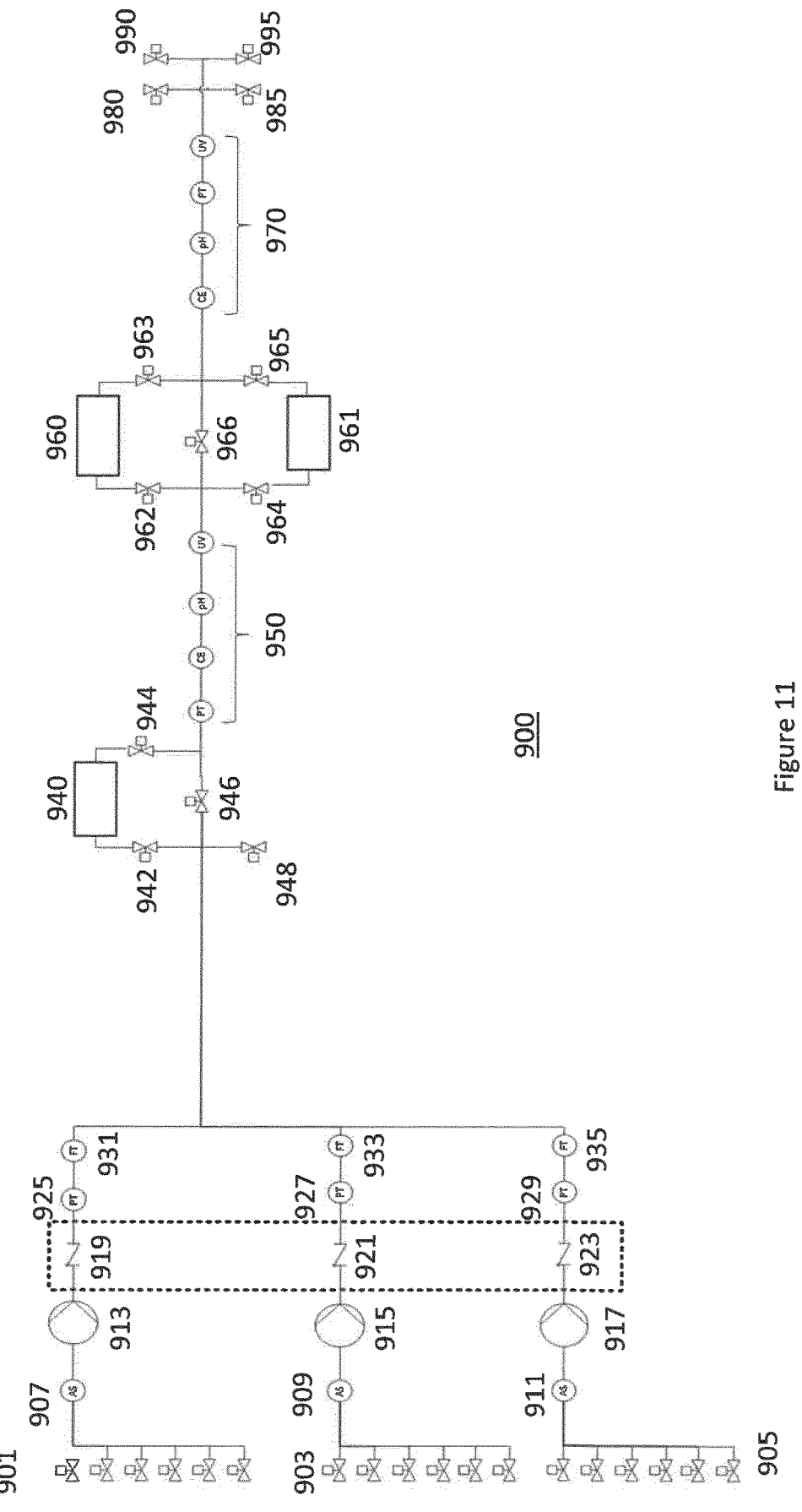
FIG. 11 shows a schematic representation of an exemplary chromatography system.
Figure 12:
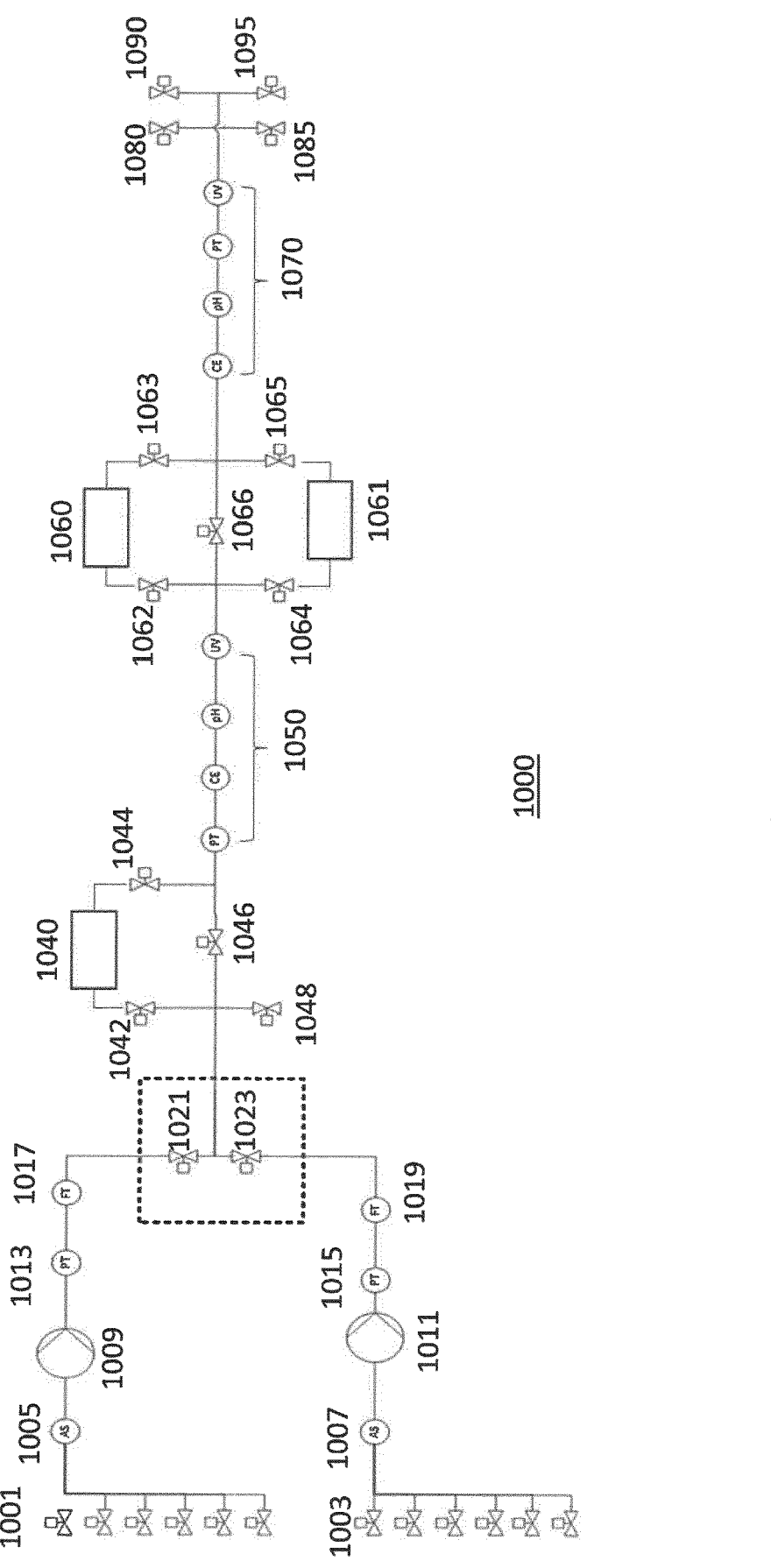
FIG. 12 shows another schematic representation of an exemplary chromatography system.

FIGS. 11 and 12 show two examples of a chromatography system in which one or more of the measures for optimizing the chromatographic process as illustrated heretofore are implemented.

FIG. 11 shows an exemplary implementation of a chromatography system 900. The system 900 has three inlet lines, each one comprising a plurality of inlet valves 901/903/905, an air sensor 907/909/911, a pump 913/915/917, a check valve 919/921/923, a pressure sensor 925/927/929 and a flowmeter 931/933/935. One inlet line is for the feed, another one is for water to perform inline dilution, and the last one is for the buffers.

After the three inlet lines are merged, a filter 940 is provided along the flow path. In particular, the flow path is provided with two filter valves 942, 944 for connecting the filter 940. The flow path further comprises a filter bypass valve 946 and a discharge valve 948, which provide alternative routes to an incoming fluid.

Subsequently two membrane adsorbers (or two stacks) 960, 961 are connected to the flow path, each by means of two membrane valves 962, 963 and 964, 965, respectively. The volume of the each membrane adsorber/each stack is 150 mL. Sensor sets 950 and 970 for measuring pressure, conductivity, pH and absorption are implemented before and after the membrane adsorbers 960, 961. The flow path further comprises membrane bypass valve 966.

Finally, four outlet valves 980, 985, 990 and 995 are installed for the discharge of waste, the final product and various process intermediates.

All the valves in system 900 are controlled to have a switching time of less than about 3 seconds, excluding the plurality of inlet valves 901, 903, 905, after which, however, check valves 919, 921, 923 are implemented, respectively.

As mentioned, due to the smaller volume of the stationary phase compared to a traditional column chromatography and the associated lower binding capacity per cycle, a higher number of membrane chromatography cycles is required to process a given volume of feed. However, each cycle is shorter, as can be seen from the following table for a protein A chromatography performed with system 900.

| Step | Volume [MV] | Flow rate [MV/min] | Residence time [min] | Duration [min] |
|---|---|---|---|---|
| (Re)Equilibration | 12 | 5 | 0.2 | 2.4 |
| Load | 6.7 | 5 | 0.2 | 1.3 |
| Wash | 5 | 5 | 0.2 | 1 |
| Elution | ~2 | 5 | 0.2 | 0.4 |
| Regeneration | 10 | 5 | 0.2 | 2 |
| CIP | 1 | 5 | 0.2 | 0.2 |
| Total | 36.7 | N/A | N/A | 7 |

The above values refer to a cycle of membrane chromatography in bind and elute mode with fixed transition from one step to the following. The volume for each step is expressed in units of the membrane volume, which is 150 mL. The residence time of the protein-containing solution on the membrane is 20 seconds, because convection is primarily responsible for mass transport, leading to a more efficient adsorption with respect to the diffusion mechanism that is predominant in resins. The dynamic binding time is about 20 g/L.

Figure 9:
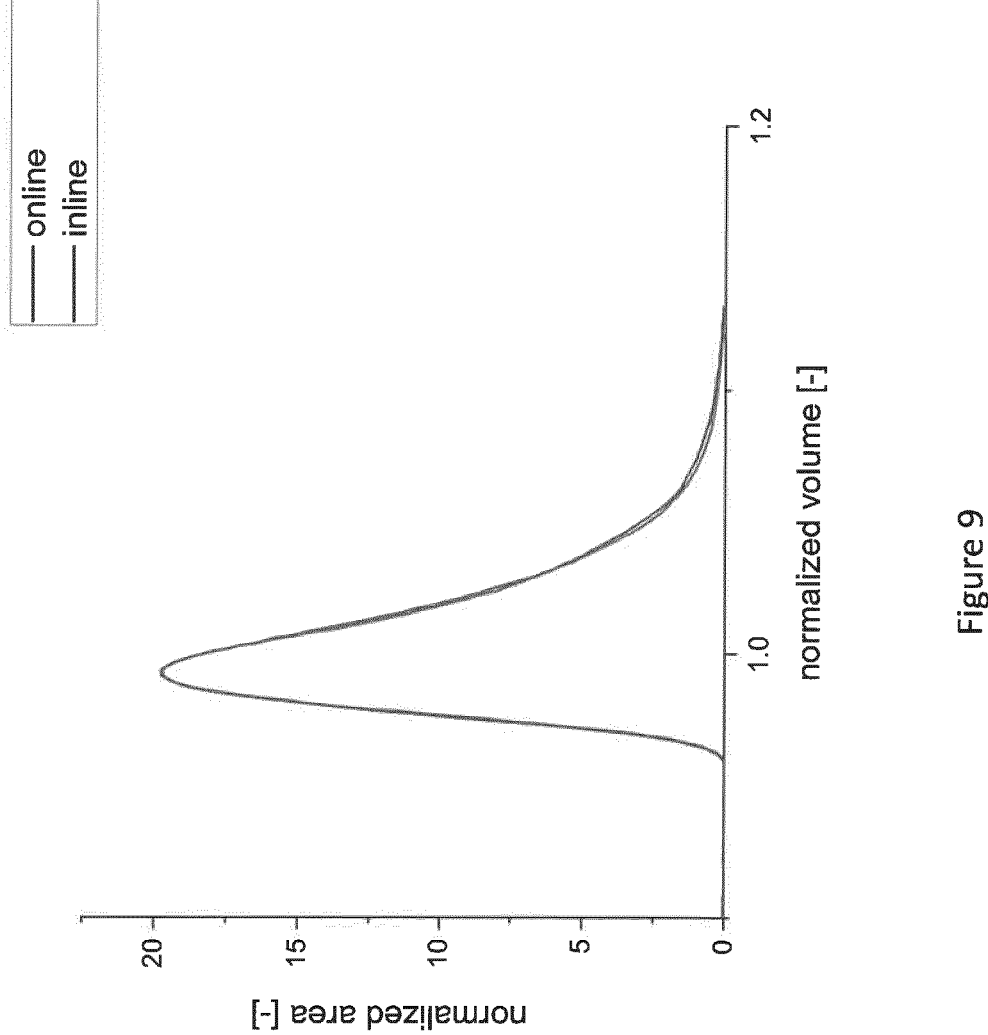
FIG. 9 shows a plot of normalized area vs normalized volume for different configurations of a filter in the chromatography system.

The cycle of membrane chromatography executed with system 900 of FIG. 9 lasts about 7 minutes, while the corresponding cycle with column chromatography takes more than 4 hours, as illustrated previously.

FIG. 12 shows another exemplary implementation of a chromatography system 1000. The chromatography system 1000 comprises two inlet lines, each one comprising a plurality of inlet valves 1001/1003, an air sensor 1005/1007, a pump 1009/1011, a pressure sensor 1013/1015, a flowmeter 1017/1019 and a mix valve 1021/1023. One inlet line is for the feed and the other one is for the buffers.

After the two inlet lines are merged, a filter 1040 is provided along the flow path. In particular, the flow path is provided with two filter valves 1042, 1044 for connecting the filter 1040. The flow path further comprises a filter bypass valve 1046 and a discharge valve 1048, which provide alternative routes to an incoming fluid.

Subsequently two membrane adsorbers (or two stacks) 1060, 1061 are connected to the flow path, each by means of two membrane valves 1062, 1063 and 1064, 1065, respectively. The volume of the each membrane adsorber/each stack is 150 mL. Sensor sets 1050 and 1070 for measuring pressure, conductivity, pH and absorption are implemented before and after the membrane adsorbers 1060, 1061. The flow path further comprises membrane bypass valve 1066.

Finally, four outlet valves 1080, 1085, 1090 and 1095 are installed for the discharge of waste, the final product and various process intermediates.

All the valves in system 1000 are controlled to have a switching time of less than about 3 seconds.

The duration of each phase of a cycle for a protein A chromatography performed with system 1000 is reported in the following table:

| Step | Volume [MV] | Flow rate [MV/min] | Residence time [min] | Duration [min] |
|---|---|---|---|---|
| (Re)Equilibration | 6.5 | 5 | 0.2 | 1.3 |
| Load | 6.7 | 5 | 0.2 | 1.3 |
| Wash | 1.8 | 5 | 0.2 | 0.4 |
| Elution | ~2 | 5 | 0.2 | 0.4 |
| Regeneration | 2 | 5 | 0.2 | 0.4 |
| CIP | 1 | 5 | 0.2 | 0.2 |
| Sum | 20 | N/A | N/A | 4 |

The above values refer to a cycle of membrane chromatography in bind and elute mode with conditional transition from one step to the following, e.g. moving to the following step when a given UV absorption value or a conductivity value has been reached.

The cycle of the membrane chromatography executed with system 1000 of FIG. 10 lasts about 4 minutes, hence system 1000 is faster than system 900 shown in FIG. 9. Part of the reason is that, as explained before, the presence of the mix valves allows to reduce a length of the flow path between the inlet lines and the filter. Further, the conditional transition makes the cycle shorter.

The reduction in back-mixing achieved by the structural design and/or flow control measures discussed heretofore results in a low peak broadening of the elution fraction and thus a high product concentration in the eluate. Therefore, there is no accumulation of dilutions over many cycles and the chromatographic process is improved in terms of efficiency and quality.

The invention claimed is:

1. A chromatography system configured to process a feed fluid containing a plurality of components, wherein at least one component of the plurality of components of the feed fluid is a target component and wherein the chromatography system comprises:

a flow path comprising a plurality of fluid control components configured to control a fluid flow; and a stationary phase, wherein the stationary phase is at least one membrane adsorber connected to the flow path and the stationary phase is configured to isolate the target component;

wherein the flow path is configured such that harvesting of the target component is optimized, wherein the plurality of fluid control components further comprises an absorption detector positioned before the at least one membrane adsorber, and wherein the chromatography process is configured to be stopped if a signal from the absorption detector changes above or below a predetermined threshold.

2. The chromatography system of claim 1, wherein the plurality of fluid control components comprises:

a first outlet valve connected to the at least one membrane adsorber and configured to be connected to a target component collection vessel; and a second outlet valve connected to the at least one membrane adsorber and configured to be connected to a waste collection vessel;

wherein the first outlet valve and the second outlet valve have a switching time of less than about 3 seconds.

3. The chromatography system of claim 1, wherein the plurality of fluid control components comprises:

a first outlet valve connected to the at least one membrane adsorber and configured to be connected to a target component collection vessel;

a second outlet valve connected to the at least one membrane adsorber and configured to be connected to a waste collection vessel; and a check valve positioned after the second outlet valve;

wherein the second outlet valve has a switching time of 3 or more seconds.

4. The chromatography system of claim 1, wherein the plurality of fluid control components further comprises:

a first inlet valve configured to be connected to a feed fluid supply; and a second inlet valve configured to be connected to a buffer supply;

wherein the first inlet valve and the second inlet valve have a switching time of less than about 3 seconds.

5. The chromatography system of claim 1, wherein the plurality of fluid control components further comprises:

a first inlet valve configured to be connected to a feed fluid supply;

a second inlet valve configured to be connected to a buffer supply; and at least one inlet check valve positioned after the first inlet valve and the second inlet valve; and wherein the first inlet valve and the second inlet valve have a switching time of or more seconds.

6. The chromatography system of claim 1, wherein the plurality of fluid control components further comprises a filter configured to filter only the feed fluid.

7. The chromatography system of claim 6, wherein the at least one membrane adsorber has a first pore diameter and the filter has a second pore diameter, the second pore diameter being less than the first pore diameter.

8. The chromatography system of claim 1, wherein the plurality of fluid control components further comprises an absorption detector positioned after the at least one membrane adsorber, and wherein a sampling rate of the absorption detector is less than about 0.7 s.

9. The chromatography system of claim 2, wherein the first outlet valve and the second outlet valve have a switching time of less than about 1 second.

10. The chromatography system of claim 2, wherein the first outlet valve and the second outlet valve have a switching time of about 0.5 seconds.

11. The chromatography system of claim 4, wherein the first inlet valve and the second inlet valve have a switching time of less than about 1 second.

12. The chromatography system of claim 4, wherein the first inlet valve and the second inlet valve have a switching time of less than about 0.5 seconds.

13. The chromatography system of claim 8, wherein a sampling rate of the absorption detector is less than about 0.5 s.

14. The chromatography system of claim 8, wherein a sampling rate of the absorption detector is less than about 0.3 s.

* * * * *